United States Patent
Kotake et al.

(10) Patent No.: US 7,110,592 B2
(45) Date of Patent: Sep. 19, 2006

(54) IMAGE RECORDING APPARATUS, IMAGE REPRODUCING APPARATUS AND METHODS THEREFOR

(75) Inventors: Daisuke Kotake, Kanagawa (JP); Akihiro Katayama, Kanagawa (JP); Hiroshi Ikeoka, Kanagawa (JP); Takaaki Endo, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 09/799,518

(22) Filed: Mar. 7, 2001

(65) Prior Publication Data

US 2003/0007668 A1    Jan. 9, 2003

(30) Foreign Application Priority Data

Mar. 2, 2001    (JP)    ............... 2001-058466

(51) Int. Cl.
*G06K 9/00*    (2006.01)
(52) U.S. Cl. ..................... 382/154
(58) Field of Classification Search ............ 382/113, 382/154, 293, 300; 745/848, 849, 850, 854, 745/855
See application file for complete search history.

(56) References Cited

U.S. PATENT DOCUMENTS

| | | | |
|---|---|---|---|
| 5,602,564 A * | 2/1997 | Iwamura et al. ............ | 345/782 |
| 5,754,189 A * | 5/1998 | Doi et al. ................... | 345/473 |
| 6,388,688 B1 * | 5/2002 | Schileru-Key .............. | 345/854 |
| 6,741,790 B1 * | 5/2004 | Burgess ..................... | 386/46 |
| 6,914,626 B1 * | 7/2005 | Squibbs ..................... | 348/231.3 |

FOREIGN PATENT DOCUMENTS

| | | | |
|---|---|---|---|
| EP | 0921376 | * | 6/1999 |
| JP | 2000235576 A | * | 2/1999 |
| JP | 11-168754 | | 6/1999 |
| JP | 11-272164 | * | 10/1999 |
| JP | 2000-235576 | | 8/2000 |
| JP | 2000-244812 | * | 9/2000 |
| JP | 2000-304559 | | 11/2000 |
| JP | 2001-005994 | | 1/2001 |
| JP | 2001-5994 | * | 1/2001 |

OTHER PUBLICATIONS

"Building Image-Based Cybercities by Using Vehicle-Mounted Cameras," Endo, et al., Society Conference of IEICE, PA-3-4, pp. 276-277, 1997.

"Building Image-Based Cybercities by Using Vehicle Mounted Cameras (2)—Generation of Wide-Range Virtual Environment by Using Photorealistic Images", Hirose, et al., Proceedings of the Virtual Reality Society of Japan, Second Annual Conference, 1997.

* cited by examiner

*Primary Examiner*—Jingge Wu
*Assistant Examiner*—Tom Y. Lu
(74) *Attorney, Agent, or Firm*—Fitzpatrick, Cella, Harper & Scinto

(57) ABSTRACT

An image/map association division displays map data stored in a map data storing division, and sets a plurality of segment points and a "path" (route) sandwiched by two segment points on a map. The image/map association division reproduces video data stored in an image data storing division, and displays the map data stored in the map data storing division. If the route set on the map and desired frames of the video data being reproduced are designated via an operation division, association data for associating the segment points at both ends of the "route" with the designated frames is generated and it is stored in the association data storing division.

9 Claims, 25 Drawing Sheets

FIG. 5B

| VCR60-1 | |
|---|---|
| FRAME NUMBER | FRAME DATA |
| 00001 | |
| 00002 | |
| ......... | |

| VCR60-2 | |
|---|---|
| FRAME NUMBER | FRAME DATA |
| 00001 | |
| 00002 | |
| ......... | |

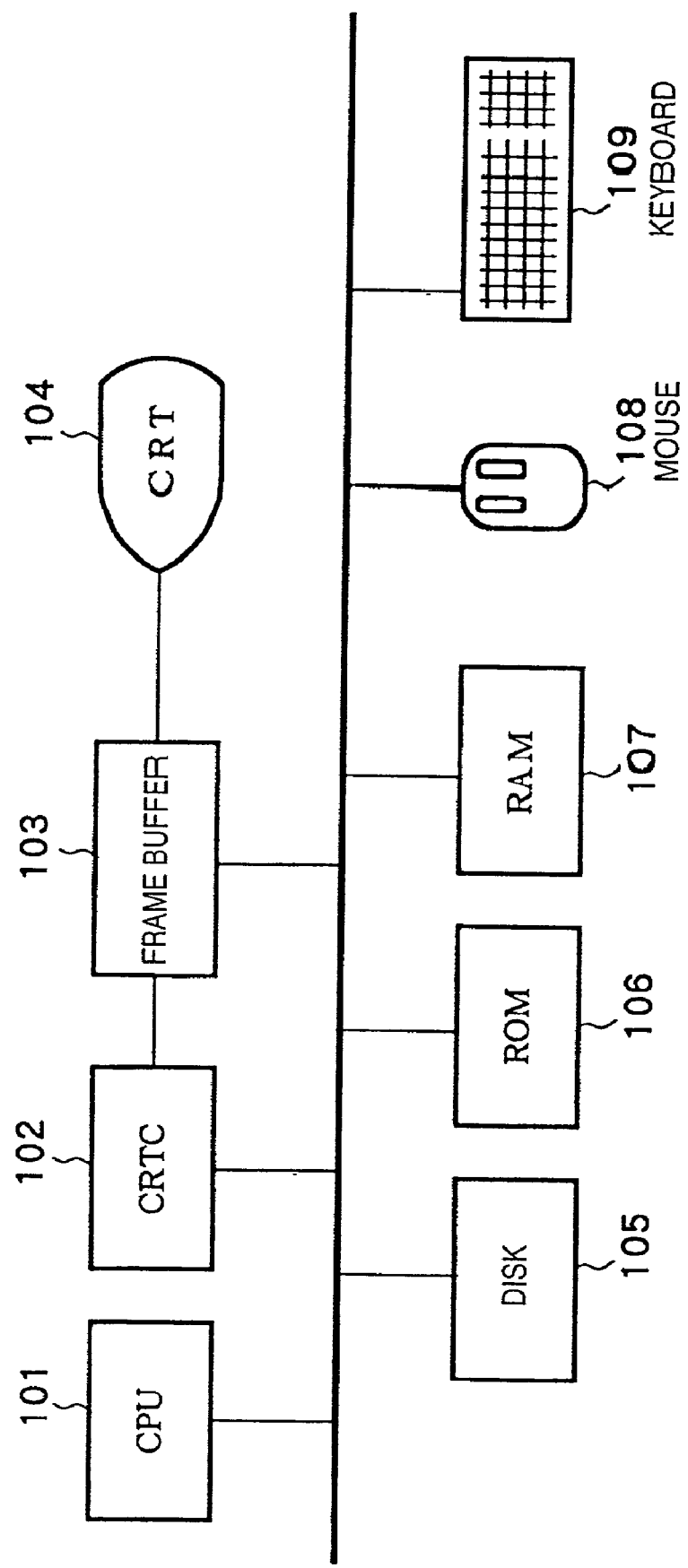

| ROUTE ID | STARTING SEGMENT POINT | ENDING SEGMENT POINT | ROUTE NAME | STARTING FRAME | ENDING FRAME | FRAME POSITION INFORMATION |
|---|---|---|---|---|---|---|
| R1 | P1 | P2 | ○× | 000001 | 000100 | $R_{1-1}(u_0, v_0), R_{1-2}(u_1, v_1), R_{1-2}(u_2, v_2) \cdots$ $R_{1-100}(u_{100}, v_{100})$ |
| R2 | P2 | P3 | | | | |
| R3 | P2 | P4 | | | | |
| ⋯ | ⋯ | ⋯ | | | | |

POSITION DATA ( GPS MEASUREMENT RESULT DATA )

| TIME CODE | POSITION ($\theta$) | POSITION ($\phi$) |
|---|---|---|
| 00:00:00:01 | 135.000 | 35.000 |
| 00:00:00:02 | 135.002 | 35.001 |
| 00:00:00:03 | 135.004 | 35.002 |
| 00:00:00:04 | 135.005 | 35.002 |
| ... | ... | |
| 00:00:00:10 | 135.010 | 35.008 |

VIDEO DATA

| TIME CODE | FRAME NUMBER | VIDEO FRAME DATA |
|---|---|---|
| 00:00:00:01 | 000001 | |
| 00:00:00:02 | 000002 | |
| 00:00:00:03 | 000003 | |
| 00:00:00:04 | 000004 | |
| : | : | |
| 00:00:00:10 | 000010 | |

IMAGE RECORDING APPARATUS, IMAGE REPRODUCING APPARATUS AND METHODS THEREFOR

FIELD OF THE INVENTION

The present invention relates to an image recording method, an image recording apparatus and a storage medium. In particular, it relates to an image recording method, an image recording apparatus and a storage medium having a user interface suitable for associating image data acquired by photographing a real space with position data on a map.

BACKGROUND OF THE INVENTION

An attempt to photograph a real space with a photographing apparatus mounted on a mobile unit and represent the photographed real space as a virtual space based on the photographed real image data by using a computer (for instance, see Endo, Katayama, Tamura, Hirose, Watanabe and Tanigawa: "Building Image-Based Cybercities by Using Vehicle-Mounted Cameras" Society Conference of IEICE, PA-3-4, pp. 276 to 277, 1997 or Hirose, Watanabe, Tanigawa, Endo, Katayama and Tamura: "Building Image-Based Cybercities by Using Vehicle-Mounted Cameras (2)—Generation of Wide-Range Virtual Environment by Using Photorealistic Images—", Proceedings of the Virtual Reality Society of Japan Second Annual Conference, and so on).

As a technique for representing a photographed real space as a virtual space based on real image data photographed by a photographing apparatus mounted on a mobile unit, a technique of reproducing a geometric shape model of a real space based on photographed image data and representing it by a conventional CG technology can be named, which is limited as to exactness, accuracy, reality of the model and so on. On the other hand, the Image-Based Rendering (IBR) technology that does not perform reproduction using a model but represents a virtual space by using a plurality of photographed images is receiving attention in recent years. The IBR technology is a technology for generating an image seen from an arbitrary point of view based on a plurality of photographed images. As the IBR technology is based on the photographed images, it can represent a realistic virtual space.

To construct a virtual space capable of walk-through by using such IBR technology, it is necessary to generate and present an image according to a position in the virtual space of a person experiencing it. Therefore, it is necessary to associate each frame of photographed image data with a position in the virtual space. However, as the virtual space is a space generated based on the real space here, the position in the virtual space is the position in the real space in other words. To be more specific, it is necessary to associate each frame of photographed image data with position data of the real space and know in which position in the real space each frame was photographed.

As a technique for acquiring position data in the real space, a positioning system using an artificial satellite represented by GPS (Global Positioning System) that is also used on car navigation systems is generally utilized. As a technique for associating photographed image data with position data acquired from GPS and so on, a method of associating it by using a time code is proposed (Japanese Patent Application Laid-Open No. 11-168754). This technique associates time data included in the position data with a time code added to each frame of photographed image data so as to associate each frame of the photographed image data with the position data.

However, in the case of GPS for instance, there is a possibility that position data cannot be acquired due to a geographical condition or an error included in the position data is too large to ignore. Therefore, as to a portion where the image data could not be associated with the position data or the association was incorrect, a technique for simply acquiring a position and associating it with the image data is sought.

SUMMARY OF THE INVENTION

The present invention has been implemented considering the above subject, and its object is to allow photographed image data to be associated with a position in a real space by simple operation.

In addition, another object of the present invention is, in the case of associating a position in photographed image data with the real space by using GPS, to allow association by simple operation as to a portion that could not be properly associated.

In addition, in the case of associating image data with a position by a general technique, the amount of data becomes enormous since each individual frame must be associated with a position. Thus, a further object of the present invention is to provide an image data record that allows the photographed image data to be associated with the real space more simply and with smaller amount of data.

Furthermore, a still further object of the present invention is to allow image reproduction based on the above image data record.

Moreover, as photographed image data is reproduced in order in the above image reproduction, reproduction must be carried out up to a desired position following the procedure in order to reproduce the desired position. Thus, it takes quite a little time and effort to reproduce a desired position. For this reason, a still further object of the present invention is to allow a point of starting reproduction of photographed image to be specified on a map.

The image recording apparatus of the present invention for attaining at least one of the above objects has the following configuration. To be more specific, it has:

map information storing means for storing map data and information indicating a plurality of segment points set on a map represented by the map data and a section sandwiched by two segment points;

image data storing means for storing image data;

instructing means for reproducing image data stored in the above described image data storing means and giving instructions for associating frames with the above described segment points;

generating means for generating association data for associating frames with the segment points based on instructions of the above described instructing means; and association data storing means for storing the association data generated by the above described generating means.

In addition, the image reproducing apparatus of the present invention for attaining at least one of the above objects has the following configuration. To be more specific, it has:

storing means for storing map data, video images of a plurality of frames related to the map data, and link information on a link with a predetermined frame in the above described video images corresponding to predetermined position information on the above described map data;

determining means for determining the video images corresponding to a plurality of positions specified on the above described map and the video images corresponding to positions among the above described plurality of positions based on the above described link information;

reproducing means for reading the video image data determined by the above described determining means from the above described storing means and reproducing it in order.

Moreover, the image recording apparatus of the present invention for attaining at least one of the above objects has:

information storing means for storing map data and a plurality of segment points set on a map represented by the map data;

image data storing means for storing image data; and association data storing means for storing association data indicating a correspondence between the image data stored in the above described image data storing means and the above described segment points.

Furthermore, the image reproducing apparatus of the present invention for attaining the above objects has:

storing means for storing map data, video images of a plurality of frames related to the map data, and link information on a link with a predetermined frame in the above described video images corresponding to predetermined position information on the above described map data;

searching means for searching frames which are the closest to the positions specified on the above described map; and reproducing means for reproducing video images stored in the above described storing means from the frame searched by the above described searching means.

In addition, the present invention provides image recording and image reproducing methods implemented by the above described image recording and image reproducing apparatuses. Moreover, the present invention provides a control program for executing these image recording and image reproducing methods by a computer and a storage medium storing the control program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5B is a diagram explaining image data to be stored in an image data storing division;

FIG. 6 is a block diagram showing hardware configuration of the image recording apparatus according to this embodiment;

FIG. 9B is a diagram explaining an example of route registration;

FIG. 14 is a diagram showing an example of a storing state of video data and position data (GPS measurement result data) in the image data storing division 10 according to the second embodiment;

DETAILED DESCRIPTION OF THE PREFERRED EMBODIMENTS

Preferred embodiments of the present invention will now be described in detail in accordance with the accompanied drawing.

First Embodiment

This embodiment will describe an image recording apparatus capable of associating photographed image data acquired by photographing with a photographing apparatus mounted on a mobile unit such as an automobile with map data as a position in a real space by using a graphical user interface.

Figure 1:
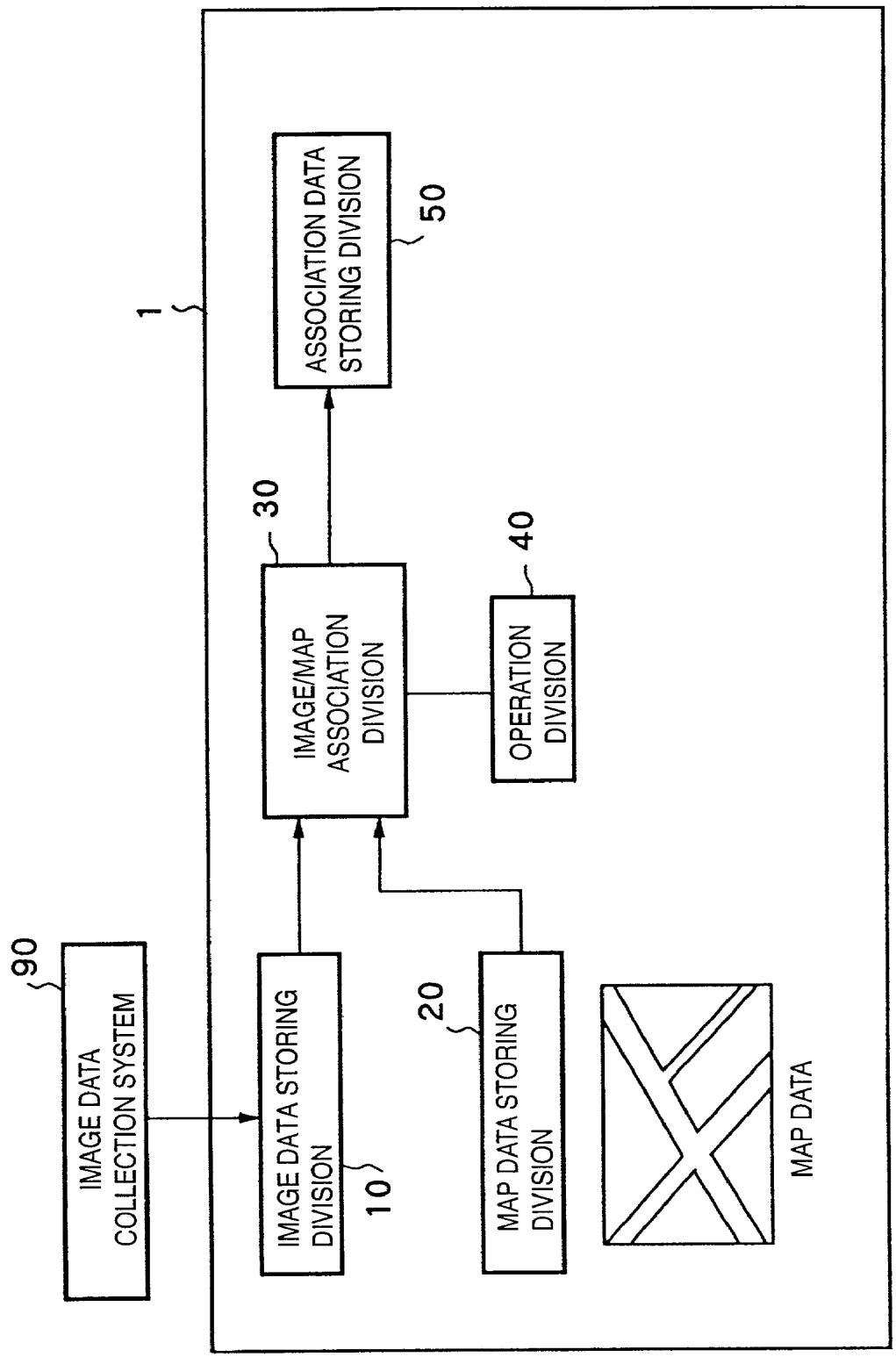
FIG. 1 is a diagram explaining configuration of functions of an image recording apparatus according to this embodiment.

FIG. 1 is a diagram explaining configuration of functions of an image recording apparatus according to this embodiment. This image recording system is configured including an image data collection system 90 and an image recording apparatus 1. The image recording apparatus 1 comprises an image data storing division 10, a map data storing division 20, an image/map association division 30, operation division 40 and an association data storing division 50.

The image data storing division 10 stores video data as a photographed image (hereafter referred to as image data) acquired by the image data collection system 90 mentioned later. The map data storing division 20 stores map data including coordinate information for representing image information of a map and each position on the map image by coordinates related to longitude and latitude. The map data storing division 20 stores at least map data corresponding to real space positions of image data photographed by the image data collection system 90 and stored in the image data storing division 10. Moreover, map data is stored on a hard disk, a RAM or another external storage that are not shown here.

The image/map association division 30 reads the image data stored in the image data storing division 10 and the map data stored in the map data storing division 20 to display it on a display device belonging to the operation division 40, and associates the image data with the map data as a user performs it. The image data and the map data thus associated are stored as association data in the association data storing division 50. Moreover, the operation division 40 is comprised of a display device, a mouse, a keyboard and so on.

Figure 2:
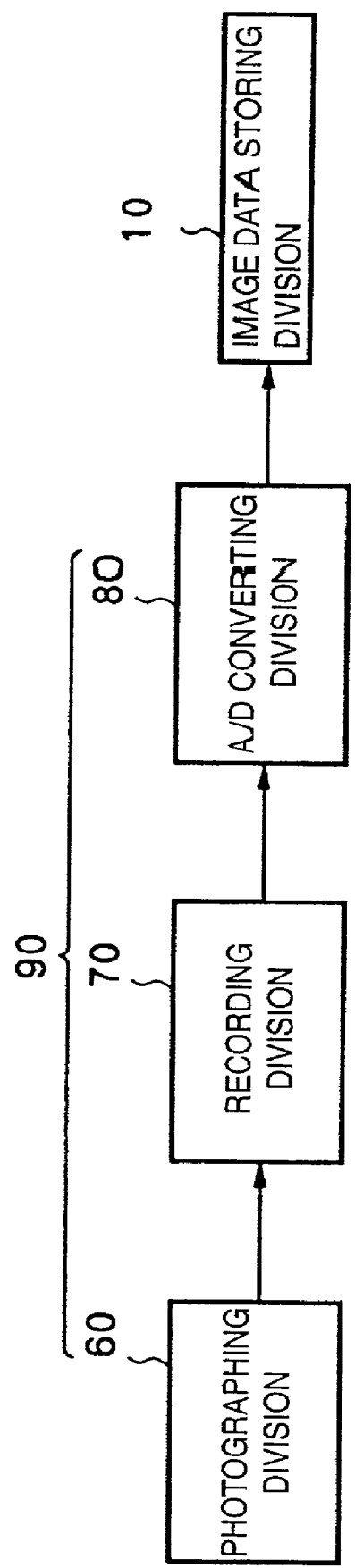
FIG. 2 is a diagram showing an example of configuration of an image data collection system for collecting image data to be stored in an image data storing division 10.

FIG. 2 is a diagram showing an example of configuration of an image data collection system for collecting image data to be stored in an image data storing division 10. As shown in FIG. 2, this image data collection system 90 is divided into three divisions of a photographing division 60, a recording division 70 and an A/D converting division 80. Each of the divisions will be described in detail hereafter by referring to FIGS. 3 to 5.

Figure 3:
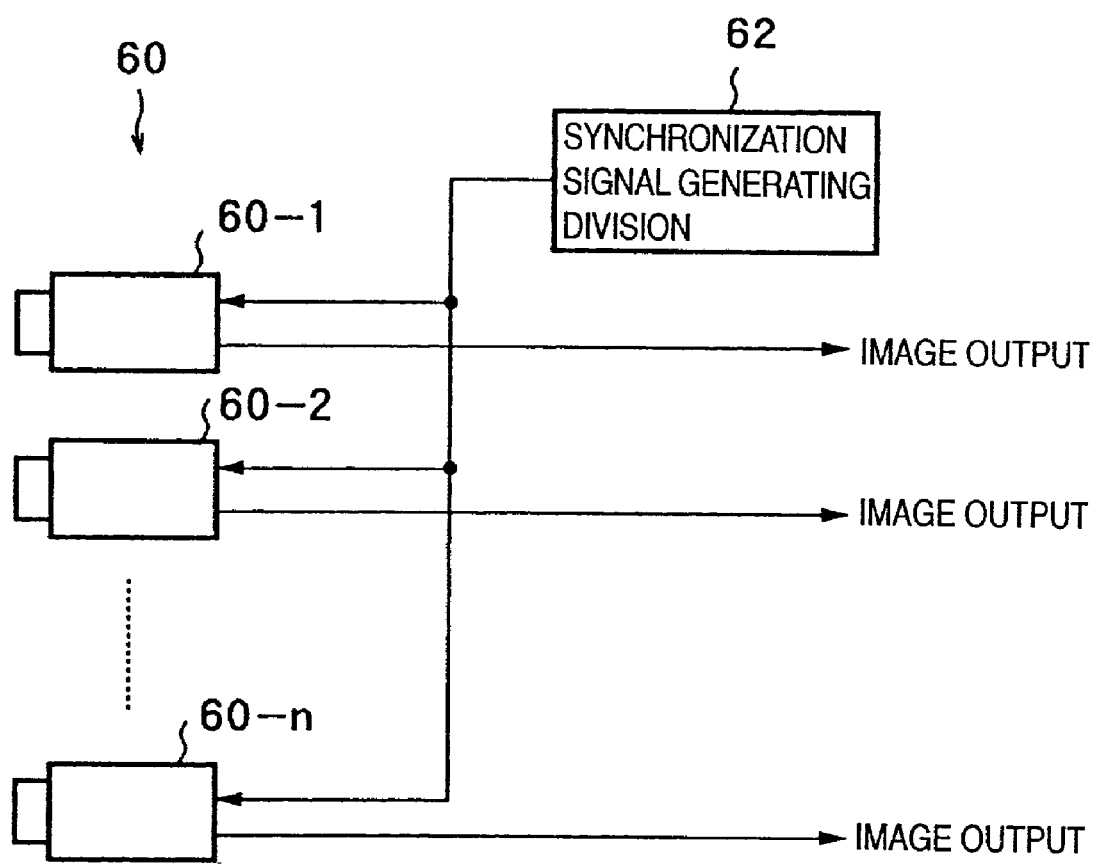
FIG. 3 is a block diagram showing configuration of a photographing division 60 in detail.

FIG. 3 is a block diagram showing configuration of a photographing division 60 in detail. In this embodiment, the photographing division 60 is mounted on a mobile unit such as an automobile when in use. The photographing division 60 is comprised of n pieces (n≧1) of video cameras (60-1 to 60-*n*) and a synchronization signal generating division 62. Video cameras 60-1 to 60-*n* can have an external synchronization signal from the synchronization signal generating division 62 inputted respectively. External synchronization signals outputted from the synchronization signal generating division 62 are used to match timing of photographing of the n pieces of video cameras 60-1 to 60-*n*.

Figure 4:
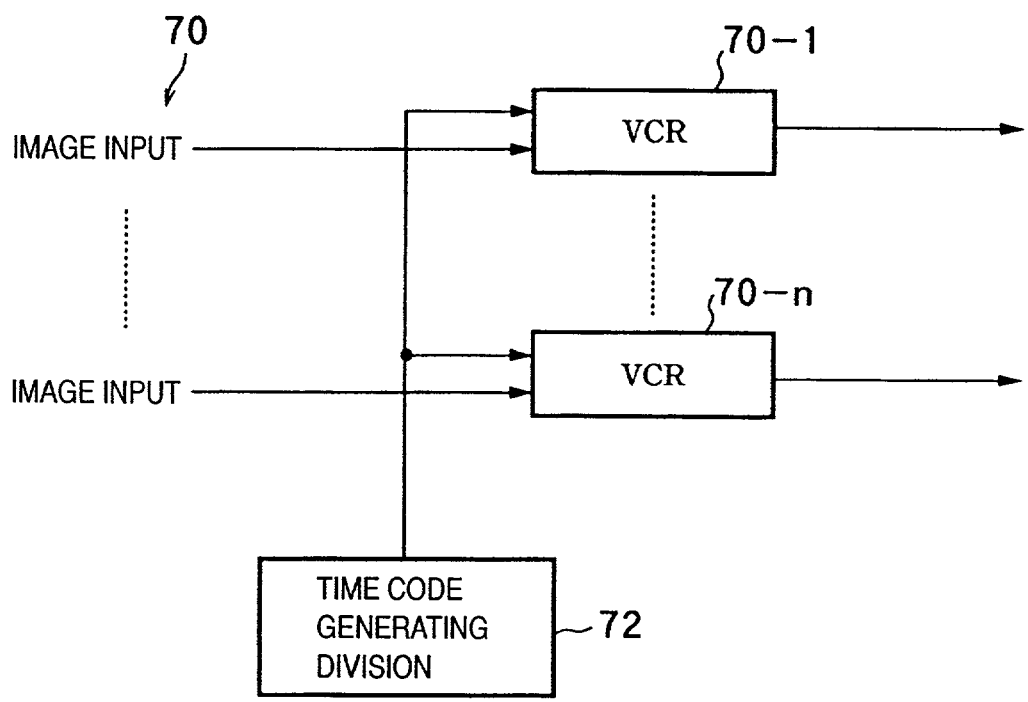
FIG. 4 is a block diagram showing configuration of a recording division 70 in detail.

FIG. 4 is a block diagram showing configuration of a recording division 70 in detail. The recording division 70 has a time code generating division 72 and a recording division (in this example, video cassette recorders (VCR)) 70-1 to 70-*n* corresponding to the video cameras 60-1 to 60-*n*. Image output from the video cameras 60-1 to 60-*n* of the photographing division 60 is input from the recording division 70-1 to 70-*n* respectively. In addition, the time code generating division 72 supplies a time code representing photographing time to the VCR 70-1 to 70-*n* respectively. The VCR 70-1 to 70-*n* captures image input form a corresponding video camera and a time code from the time code generating division 72 and stores them as image data with a time code.

Figure 5A:
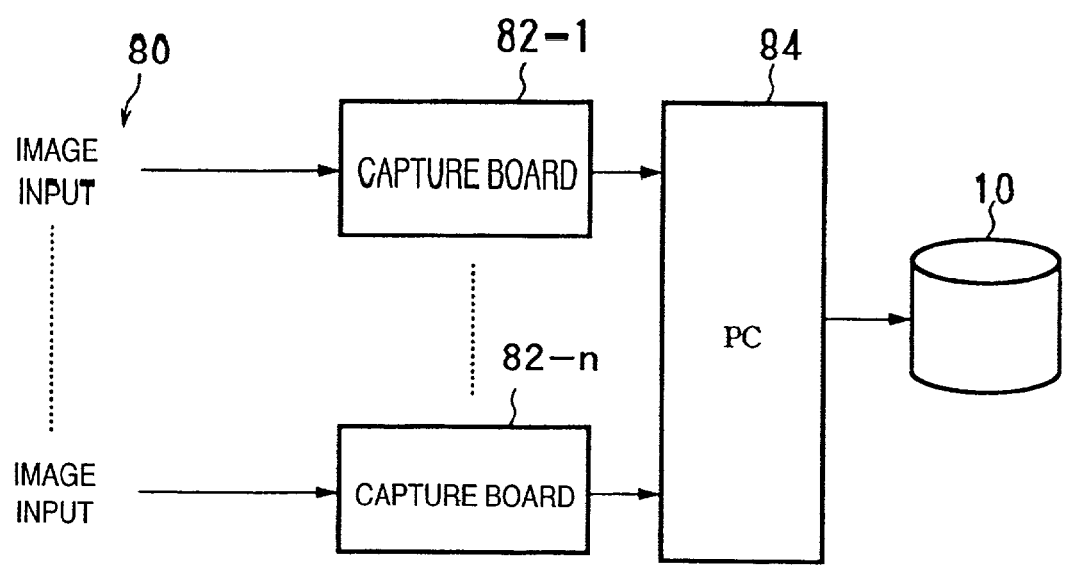
FIG. 5A is a block diagram showing configuration of an A/D converting division 80 in detail.

FIG. 5A is a block diagram showing configuration of an A/D converting division 80 in detail. The A/D converting division 80 comprises a personal computer (hereafter, a PC) 84 and a video capture board (hereafter, a capture board) 82 corresponding to each of the VCR 70-1 to 70-*n*. The number of capture boards is not always required to be equivalent to the number of video cameras, and it is possible to share the number of capture boards mountable on a PC. The A/D converting division 80 converts analog image data supplied from the VCRs into digital image data (for instance, an AVI format) and stores it on a hard disk 10 or another storage medium connected to the PC 84. When image data is captured into the PC 84 through the capture board 82, a recorded time code is used to determine a capture starting position and an ending position, so that all the digital image data acquired via n pieces of VCR and capture boards are configured entirely by capture data photographed at the same time and of the same length. Moreover, as an adoptable data format, the AVI format can be named for instance.

FIG. 5B is a diagram showing an example of image data storage form in the image data storing division 10. As shown in FIG. 5B, data is stored by associating a frame number with frame data for each of the cameras (60-1 to 60-*n*). Moreover, the same frame number is given to frame data of the same time. Furthermore, in this embodiment, while image data is stored as image data photographed by an ordinary means of photographing, it may also be stored as a panorama image by merging a plurality of frames of the same frame number.

FIG. 6 is a block diagram showing hardware configuration of the image recording apparatus according to this embodiment. The hardware configuration shown in FIG. 6 is equivalent to configuration of an ordinary personal computer. In FIG. 6, a disk 105 stores digital image data acquired by the above-mentioned image data collection system 90. The disk 105 comprises the above-mentioned image data storing division 10, map data storing division 20 and association data storing division 50. A CPU 101 executes programs stored on the disk 105 or a ROM 106, or the external storage (not shown), and associates the image data with the map data as mentioned later by using the flowchart of FIG. 7 and so on. To be more specific, it implements the image/map association division 30.

The CPU 101 provides various display instructions to a display controller 102, and then desired display is performed by the display controller 102 and a frame buffer 103 on an monitor 104. Moreover, while a CRT C is shown as the display controller 102 and a CRT is shown as the monitor 104 in the drawing, it is a matter of course that not only a cathode-ray tube but an LCD and so on may be used for the monitor. A mouse 108 and a keyboard 109 are for the user's operating input, inputting to a GUI as mentioned later. Data outputted by the image/map association division is recorded on the disk 105 or the external storage (not shown). The CRT 104, mouse 108 and keyboard 109 comprise the above-mentioned operation division 40.

Operation of the image/map association division 30 will be described, which associates image data of a real space stored in the image data storing division 10 with map information stored in the map data storing division 20 according to the user's operation in the image recording apparatus of this embodiment having the above configuration.

Figure 7:
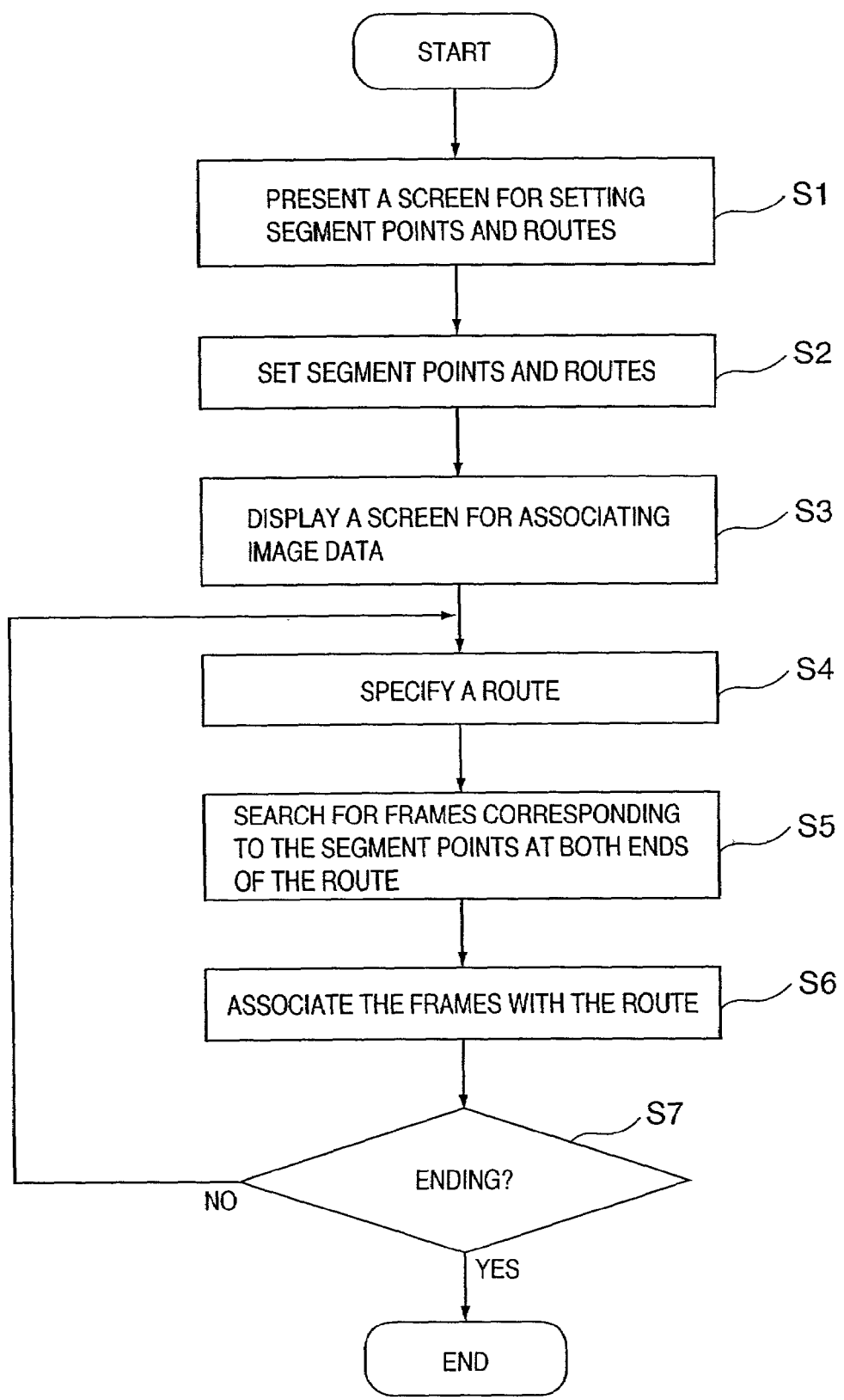
FIG. 7 is a flowchart showing a procedure by an image/map association division 30.

FIG. 7 is a flowchart showing a procedure by an image/map association division 30. First, in a step S1, the image/map association division 30 displays map data on the CRT 104 and also provides a user interface for identifying segment points and routes on the map. And in a step S1, it uses the provided user interface to set points for dividing photographing routes (hereafter referred to as segment points) and segments connecting the segment points (hereafter referred to as routes) for the displayed map data by the required numbers of segment points and routes. At this time, an ID is given to each of the segment points and routes to identify it as one and only. Moreover, a segment connecting the segment points is a straight line or a curve representing a space between two segment points, namely a section.

Figure 8:
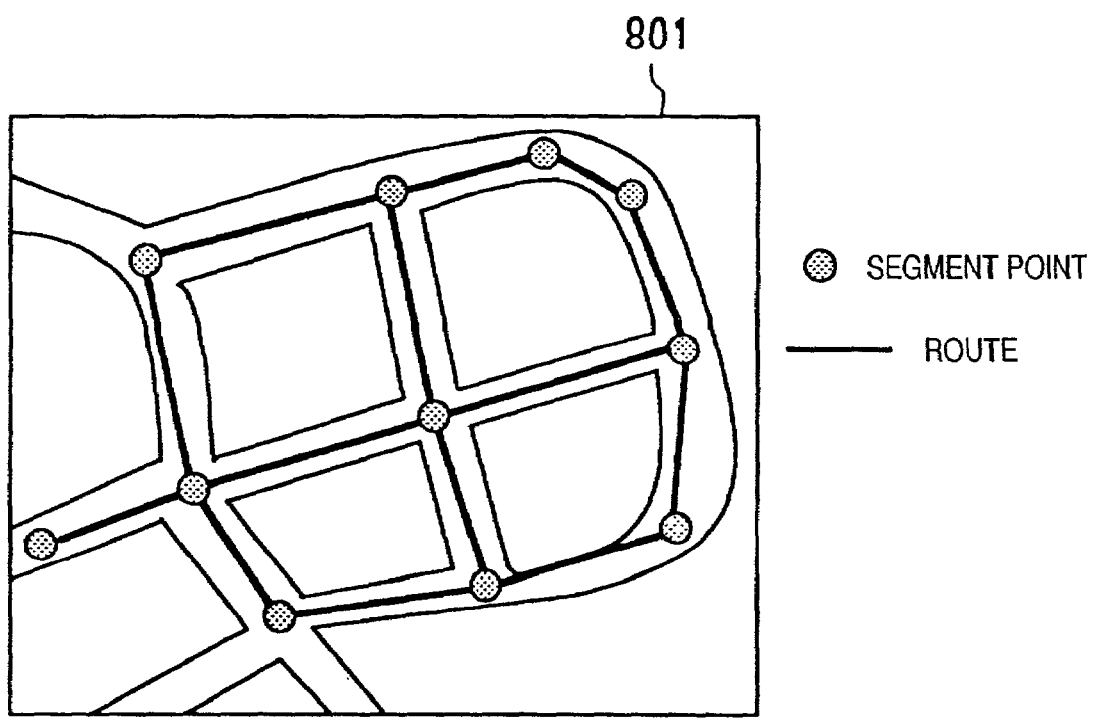
FIG. 8 is a diagram showing an example of visual display in a user interface for setting segment points and routes.

FIG. 8 is a diagram showing an example of visual display in a user interface for setting segment points and routes. In the step S1, it displays map data displayed on the screen and also provides a user interface (GUI) for setting later-mentioned segment points and routes on the map 801. In the step S2, it mainly sets segment points at turning points and so on of a route along a photographing route and also sets a route sandwiched by the segment points at both ends by user operation on the map displayed in the step S1. Here, an ID of a segment point or a route can be given either automatically or by user setting. In addition, it is possible to allow names (XX street, YY intersection, etc.) to be given to the routes and segment points so that a search can be made by such a name. Moreover, segment points can be set not only at turning points of a route but also at any location on the route.

Moreover, the above setting of segment points and routes is performed by the following operation for instance. If the mouse is clicked on the map displayed on the screen, a segment point is set at a location clicked on. As a matter of course, the segment point can also be given as a coordinate value on the map from the keyboard. In addition, a route can be set by dragging a mouse pointer from a segment point to another segment point. As a matter of course, the route can also be set by giving IDs of two segment points from the keyboard and connecting them.

Figure 9A:
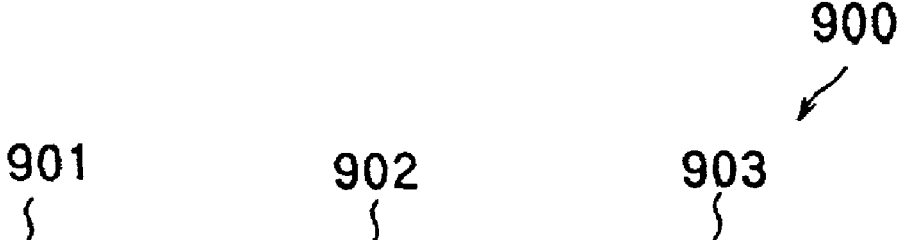
FIG. 9A is a diagram explaining an example of segment point registration.

While various methods are thinkable as to storing of the segment points and routes thus set, they are kept in the forms shown in FIGS. 9A and B in this embodiment. FIG. 9A is a diagram explaining an example of segment point registration. And FIG. 9B is a diagram explaining an example of route registration. As shown in FIG. 9A, for each of the segment points on a segment point list 900, a segment point ID 901 for identifying it, map coordinate data 902 representing its position on the map and a name 903 given to the segment point are registered. Moreover, name data may be either given or not given. Also, as shown in FIG. 9B, for each of the routes on a route list 910, a route ID 911, a starting segment point 912 and an ending segment point 913 showing the segment points at both ends and a route name 914 are registered. Moreover, name data does not have to be added. Furthermore, a starting frame 915, an ending frame 916 and frame position information 917 are mentioned later.

Next, returning to FIG. 7, in order to associate the image data collected by the image data collection system 90 and stored in the image data storing division 10 as in FIG. 5B with the segment points and routes set by the above processing, a screen (GUI) for that operation is displayed on CRT 104 in the step S3.

Figure 10:
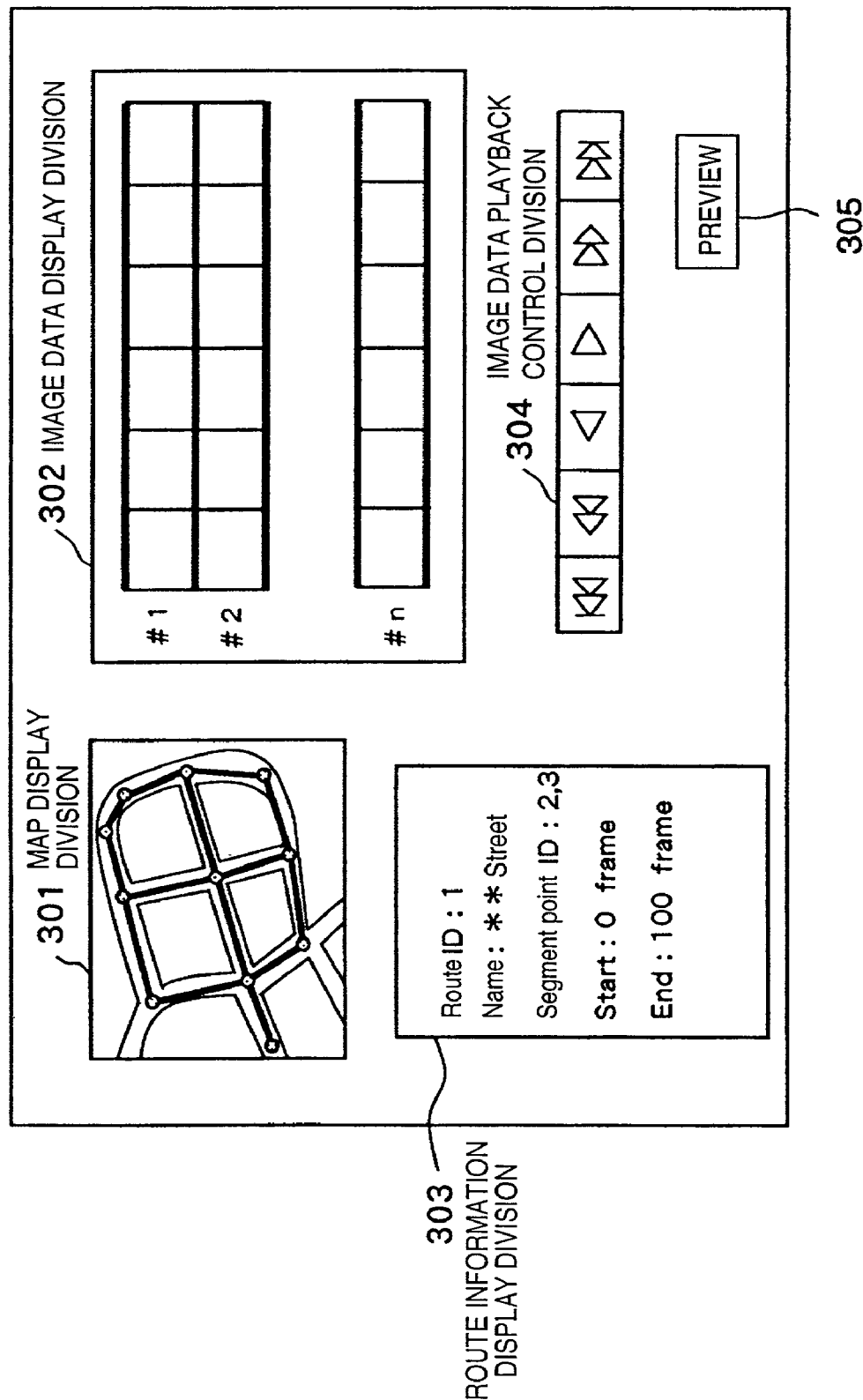
FIG. 10 is a diagram showing an example of display on a GUI screen for associating image data with map data according to this embodiment displayed in a step S3.

FIG. 10 is a diagram showing an example of display on a GUI screen displayed in the step S3 for associating image data with map data according to this embodiment. On this GUI, a map data display division 301, an image data display division 302, a route information display division 303 and an image data reproduction operation division 304 are displayed. The map data display division 301 displays the map data held by the map data storing division 20 and the route and segment points (registered on the segment point and route lists) set in the above-mentioned steps S1 and S2 with a circle and a thick line respectively for instance.

The image data display division 302 reproduces the image data held in the image data storing division 10. The image data display division 302 displays images photographed by a plurality (n pieces in this example) of cameras in synchronization. The route information display division 303 displays an ID of a route, a name given to the route, IDs of showing the segment points at both ends of the route and frame numbers (Start and End) of the image data corresponding to the route. However, the frame numbers are not displayed until they are associated with the route (in this case, they may also be displayed as undecided). In addition, the image data playback operation division 304 is equipped with operation buttons such as reproduction, stop, fast forward, fast rewind and frame advance.

In steps S4 to S6 hereafter, the image data frame is associated with the route by using the GUI shown in the above FIG. 10. First, in the step S4, the user selects with the mouse a desired route out of the routes set in the earlier steps S1 and S2 and displayed in the map data display division 301. Moreover, a route is selected by double-clicking on or near a desired route displayed in the map data display division 301 or opening a dialog box and entering it from the keyboard. Here, information on the selected route is displayed in the route information display division 303.

And in the step S5, a video frame corresponding to both ends of this selected route is searched. To be more specific, the user has the image reproduced in the image data display division 302 by using the playback, stop, fast forward, fast rewind, frame advance buttons and so on of the image data reproduction operation division 304, and searches through the image data for frames closest to the image photographed at the segment points at both ends of the selected route. And the two frame numbers corresponding to both ends of the route are determined. In the step S6, the two frames selected as above and the image data between the two frames are associated with the selected route, and are registered as association data. Thus, the frame numbers determined for the starting segment point and the ending segment point at both ends of the route are registered in the starting frame 915 and the ending frame 916 of the route list shown in FIG. 9B respectively.

Figure 11:
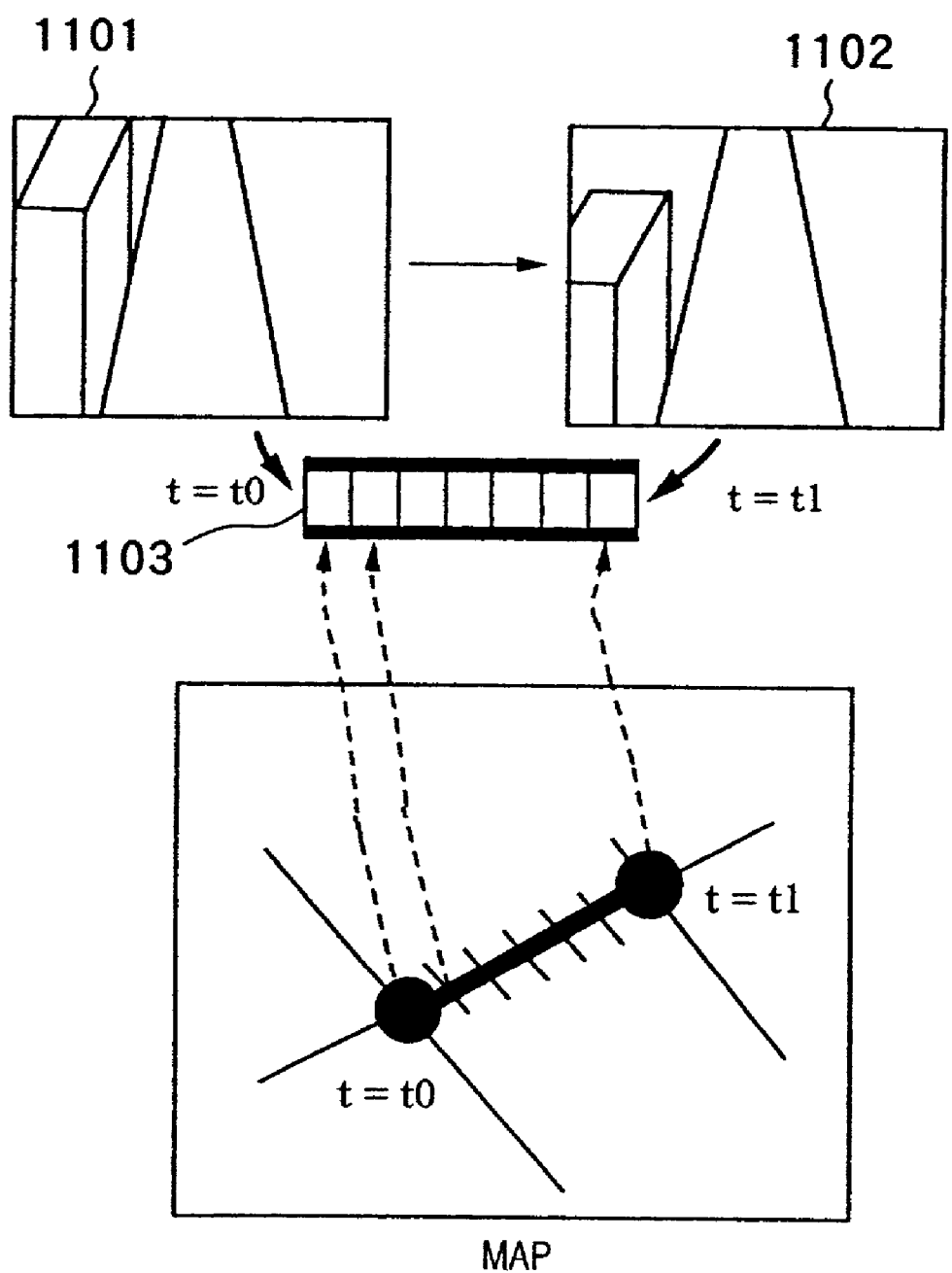
FIG. 11 is a diagram showing a concept of seeking a position where each image frame was photographed by associating a map with image data.

FIG. 11 is a diagram showing a concept of seeking a position where each image frame was photographed by associating the map with the image data. As mentioned above, an image 1101 displayed by frame advance operation and so on is selected and associated with a segment point t0, and an image 1102 is selected and associated with a segment point t1. And then, an image frame group 1103 between the two frames associated with the segment points are associated with the route of which both ends are the two segment points t0 and t1 on the map. To be more specific, information for associating the route with the frame group is acquired. Furthermore, in this embodiment, the distance between the segment points is equally divided by the number of frames of the image frame group 1103 allocated between the segment points so as to easily acquire the positions in the real space where respective frames were photographed. The acquired position information of the respective frames is registered in frame position information 917 of the route list shown in FIG. 9B. In this embodiment, however, position information of the respective frames may be omitted since it can be acquired by interpolation if map coordinates of the segment points at both ends are known.

To be more specific, either of the following methods can be used for the image frame group 1103. (1) To give and store the position information acquired by the above interpolation for each of the image frames existing between the video frames associated with the segment points. (2) To register only the video frames corresponding to the starting and ending segment points of each route and on image reproduction, evenly reproduce the image frames between the segment points of the route according to the number of frames, reproduction time or distance between the segment points. FIG. 9B shows a storing form by the method (1), and the frame position information 917 provides each of the frames with a position of the starting segment point, a position of the ending segment point or a virtual position. For instance, $(u_1, v_1)$ and $(u_{100}, v_{100})$ correspond to the starting and ending segment points of a route R1, and a coordinate value that evenly places the frames between them on the route R1 is given. Moreover, as mentioned above, the frame position information 917 may be omitted in the case of adopting the method (2).

If association of the image data with the selected route is completed as above, in a step S7, it returns to the step S4 in the case of performing association with another route. On the other hand, this process is terminated by the user's terminating operation in the case of performing no more association.

Moreover, in this embodiment, the image data display division 302 displays the images photographed by n pieces of video camera in synchronization. Thus, the images from the cameras facing to and from, and right and left for instance can be simultaneously seen, which allows a position of an intersection and so on to be more correctly identified. However, the display form in the image data display division 302 is not limited to this. For instance, it is also possible to display images from one of the n pieces of video camera. The CPU's load is alleviated since images from just one camera have to be displayed. It is also possible to make it specifiable as to images from how many cameras are simultaneously displayed. Moreover, in the case of simultaneously displaying images from one camera or a desired number of cameras, it is also possible to make it selectable as to which camera's image should be displayed in the image data display division 302. Furthermore, in the case of simultaneously displaying images from a desired number of cameras, it is also possible to make the number of cameras specifiable.

In addition, in the case where the frame advance is performed, it is possible, in the image data display division 302, to display a plurality of successive frames for each of the images from the cameras as shown in the image data display division 302 of FIG. 10. In this embodiment, if a desired frame is selected with the mouse, a screen pops up asking which of the segment points (starting or ending point) at either end of the route the frame should be associated with, and the desired segment point is associated with an image frame by answering it.

The data stored as above in the association data storing division 50 from the image/map association division 30 is data wherein the image data and the data on the map are linked in some form. To be more specific, it is data capable of, if a desired position on the route on the map is specified, identifying and displaying a corresponding image data frame.

Figure 12:
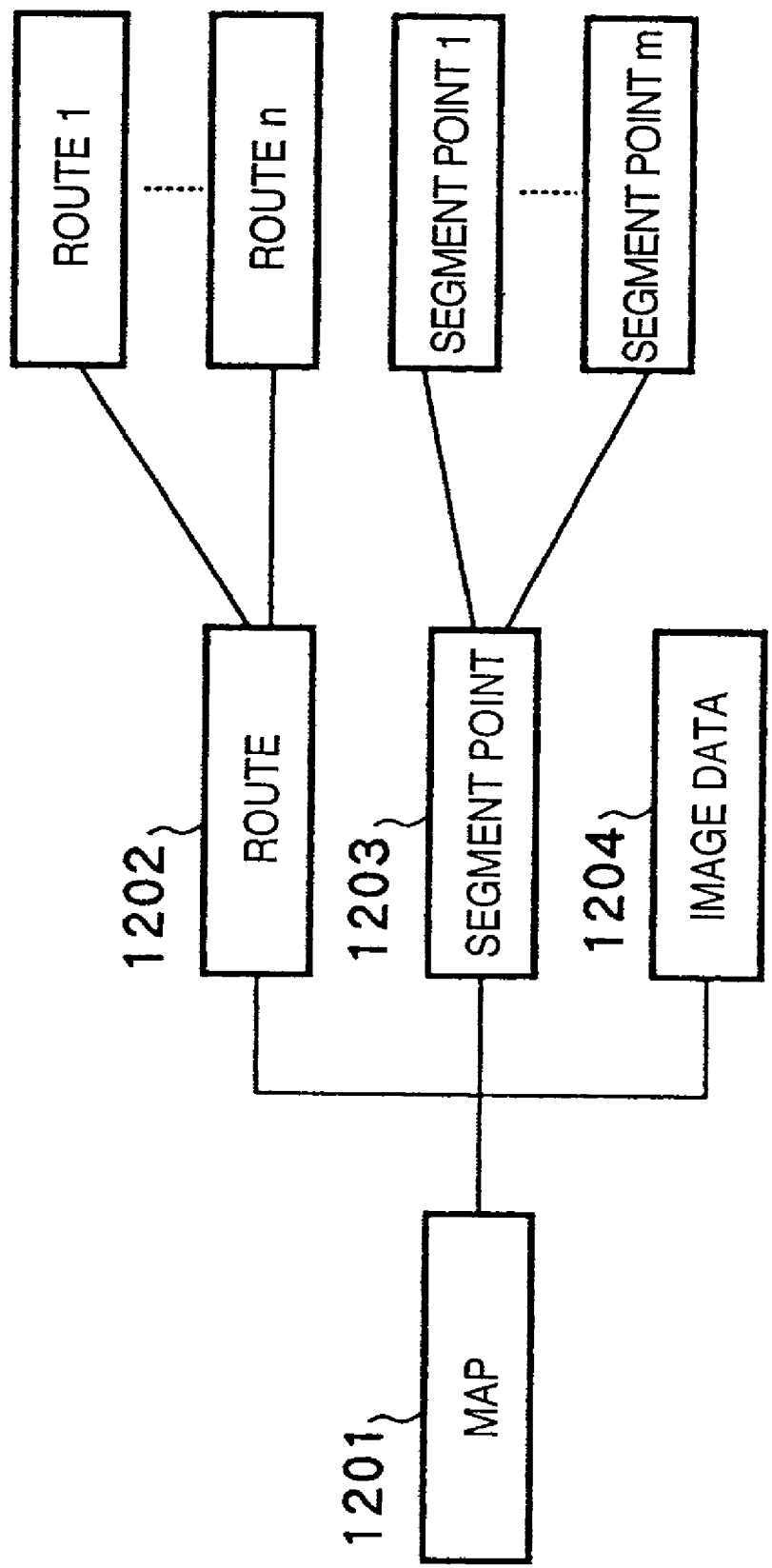
FIG. 12 is a diagram showing an example of a link data record format stored in an association data storing division 50.

FIG. 12 is a diagram showing an example of a link data record format stored in an association data storing division 50. This data format has tree structure and its vertex is the map data. Map data 1201 is the data stored in the map data storing division. The map data 1201 is linked with route data 1202, segment point data 1203 and image data 1204. The route data 1202 includes the route list 910 shown in FIG. 9B, and it records frame position information indicating the route names, IDs of the, segment points at both ends, the frame numbers of the image data corresponding to the segment points at both ends and positions of the frames of the image data. In addition, the segment point data 1203 includes the segment point list 900 shown in FIG. 9A, and it records segment point names and IDs of the routes connected to the segment points. The image data 1204 is the image data held in the image data storing division 10 or a panorama image by merging a plurality of frames of the same frame number, and is stored as associated with the frame numbers.

To be more specific, the images photographed by the video cameras 60-1 to 60-n of the photographing division 60 are recorded by giving a frame number to each video frame, and in the case where, as shown in FIG. 11, the segment points t0, t1 are selected on the map and association is performed by selecting video frames corresponding to those segment points, the segment points t0, t1 and the video frame numbers associated thereto are stored as linkable.

In addition, in FIG. 12, while the frame numbers corresponding to the segment points on the map are linked and stored, it is also possible to divide the distance between the segment points by the number of frames equivalent to the distance between the segment points so as to virtually set frame positions and store them by allocating them to the video frames. Moreover, as mentioned above, in the case where only the video frames corresponding to the segment points are stored, the video frames between them, when reproduced, are reproduced in order according to distance between the segment points and/or reproduction time. Furthermore, detailed contents of the reproduction system will be described in the third embodiment.

As described above, it is possible according to the first embodiment to easily associate the collected photographed data with the positions on the map.

Moreover, the GUI shown in FIG. 10 has a preview button 305 provided. If a desired route is selected on the map data display division 301 and this preview button is pressed, a window pops up and the video frames allocated to a specified section of the selected route are successively reproduced. Providing such a preview button allows the user to perform allocation while checking the state of allocation at any time, and so it improves operability.

Second Embodiment

In the above-mentioned first embodiment, the GUI shown in FIG. 10 is used to associate all of the collected photographed image data with positions on the map. In the second embodiment, the position information acquired by GPS is effectively utilized to associate the image data with the map information so as to perform association work more efficiently. To be more specific, when associating the photographed image data with the position data in a real space in the second embodiment, the position data is associated with portions of which position data has not been acquired by GPS, portions of which acquired position data has a significant error and so on. In other words, the association of the position data by using GUI described in the first embodiment is used to interpolate the position data acquired by GPS.

Figure 13:
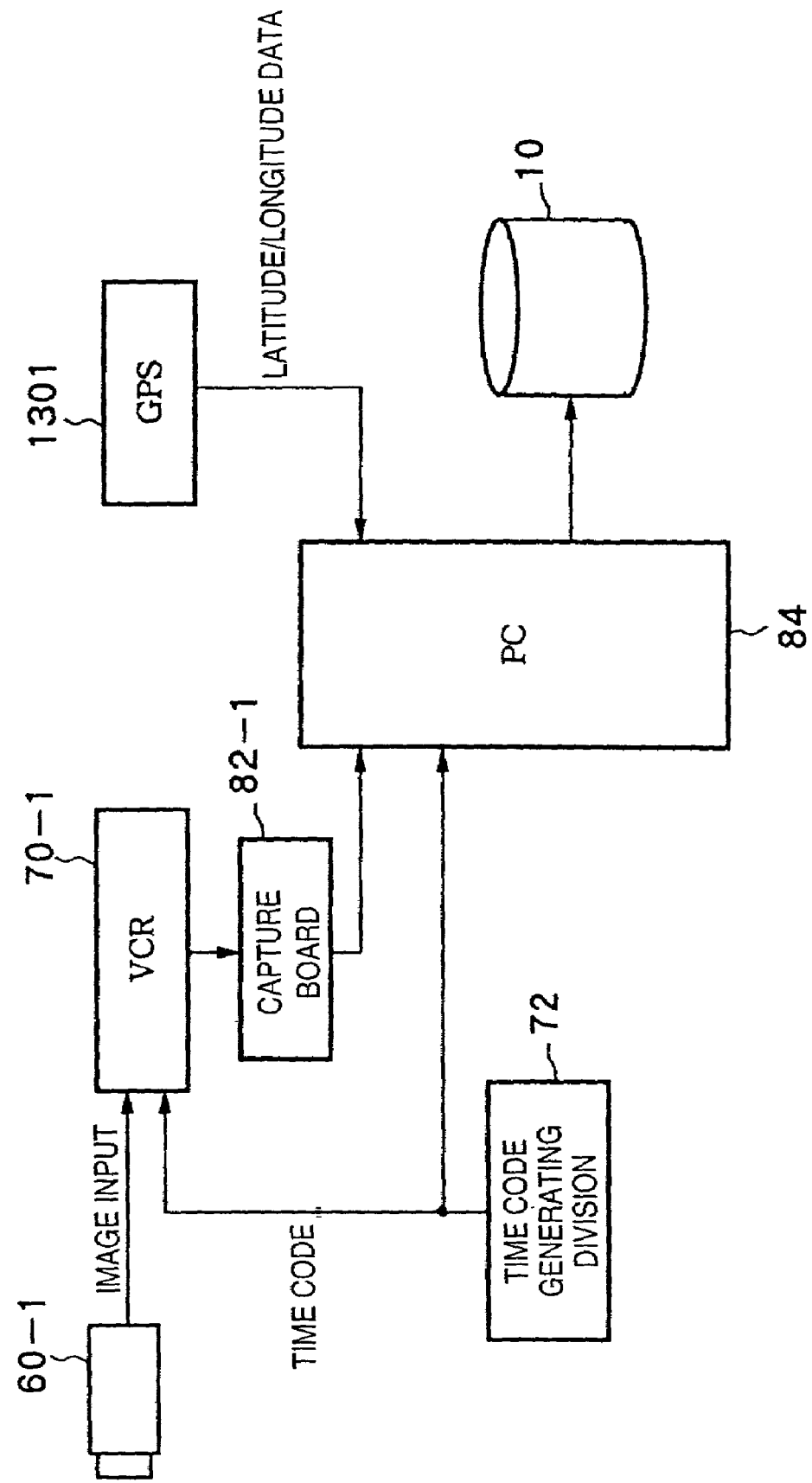
FIG. 13 is a block diagram showing configuration of an image collection system according to a second embodiment.

FIG. 13 is a block diagram showing configuration of an image collection system according to the second embodiment. In FIG. 13, an image from the video camera 60-1 is recorded on the VCR 70-1. At this time, as described in the first embodiment, a time code from the time code generating division 72 is supplied to the VCR 70-1, and image data with a time code is recorded on the VCR 70-1. Output of VCR 70-1 is converted into digital image data (for instance, an AVI format) by a capture board 82-1 and is stored on the hard disk 10 or another storage medium connected to the PC 84. Moreover, while FIG. 13 shows a set of a video camera, a VCR and a capture board, it is needless to say that it may be configured by a plurality of sets as in the first embodiment.

In addition, in FIG. 13, latitude and longitude data from a GPS division 1301 and a time code from the time code generating division 72 are supplied to the PC 84. The PC 84 stores information associating such latitude and longitude data with the time code on the hard disk 10. FIG. 14 is a diagram showing an example of a storing state of video data and position data (GPS measurement result data) in the image data storing division 10 according to the second embodiment. Thus, as shown in FIG. 14, a video frame to which a time code is added and position data to which a time code is added are stored. Therefore, the video frame is associated with the position data via this time code.

Moreover, detailed description of calculation of a three-dimensional position in GPS is omitted here since it is in the public domain. As above, images are photographed by n pieces of video cameras while latitude and longitude data P ($\theta$, $\phi$) acquired sequentially by GPS is associated with a time code from the time code generating division 72 and stored. Based on this time code, each individual frame of the images is associated with the latitude and longitude data.

Figure 15:
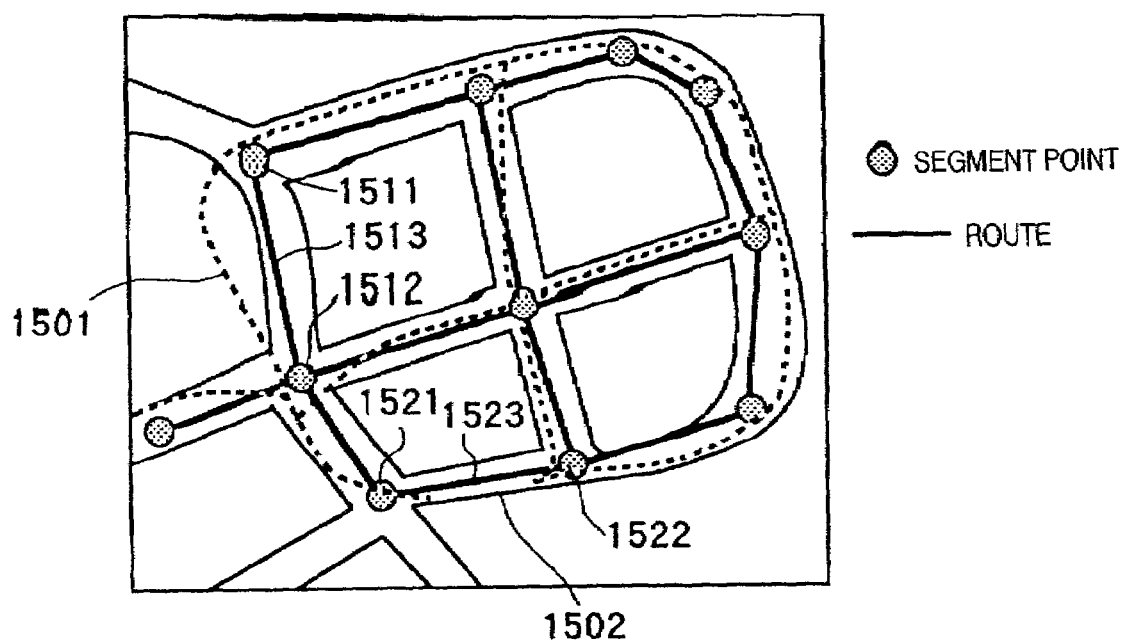
FIG. 15 is a diagram showing a display state of a map data display division 301 according to the second embodiment.
Figure 16:
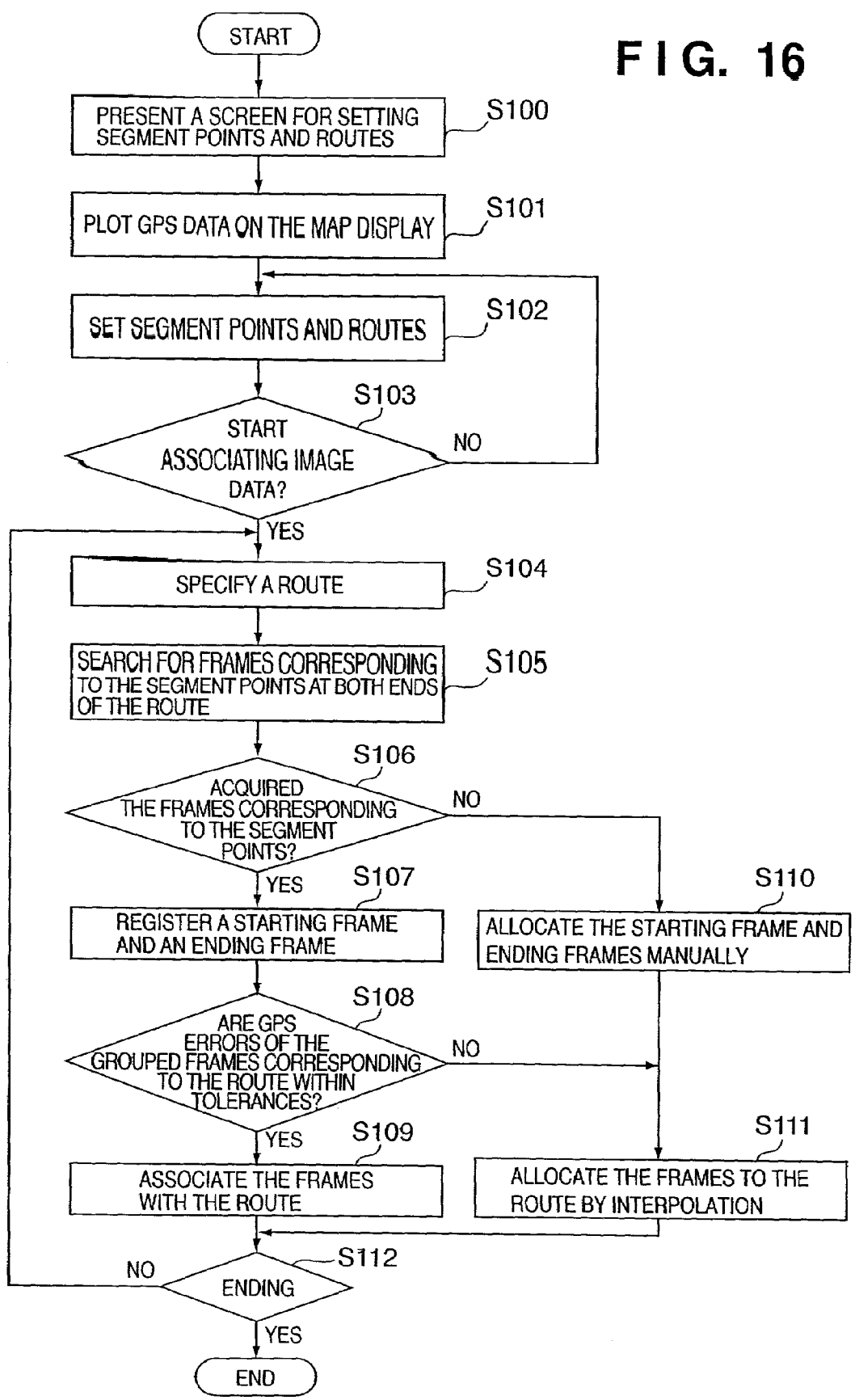
FIG. 16 is a flowchart explaining a procedure according to the second embodiment.

FIG. 15 is a diagram showing a display state of a map data display division 301 according to the second embodiment. In addition, FIG. 16 is a flowchart explaining a procedure according to the second embodiment.

First, in a step S100, a screen for setting the segment points and routes is displayed. This is the same as the step S1 in the above-mentioned FIG. 7. Next, in a step S101, the GPS data is plotted onto the map display. Moreover, FIG. 15 shows a plot by GPS by dotted lines.

Thereafter, in a step S102, as described in the step S2 in FIG. 7, the segment points and routes are set on the map displayed in the step S1. At this point in time, as shown in FIG. 15, the map, the plot of the GPS data, the segment points and routes are displayed on the map data display division 301. If instructed to start an image data association process thereafter, the process proceeds from a step S103 to a step S104. Moreover, a determination as to a start of the image data association process can be made by, placing an adequate button on a user interface shown in FIG. 10, whether it is clicked on or not.

Now, if the image data association process starts, in the step S104, it first has the user specify a route for associating the image data with. If the route is specified, the segment points at both ends of the specified route are acquired in the step S105 and the frames corresponding thereto are searched. As for the search, coordinates of the segment points on the map are compared with coordinates of the GPS data of the frames and frames which are the closest to the position of the segment points is acquired. And if that distance is within a specified range, they are the frames corresponding to the segment points. In the step S105, an attempt is thus made to acquire the frames corresponding to the segment points at both ends of the specified route, and if the frames are acquired, it proceeds from a step S106 to a step S107 and a starting frame and an ending frame shown in FIG. 9B are registered as to the specified route.

Furthermore, in a step S108, the positions of the grouped frames sandwiched by the two frames acquired in the step S105 are examined to see if any of them significantly deviates from the specified route or is missing the GPS data. And in the case where the positions of the examined grouped frames are within a predetermined distance to the specified route, it proceeds to a step S109 and registration with frame position information 917 in FIG. 9B is performed according to the position information based on the grouped frames and the GPS data.

On the other hand, in the case where the frame corresponding to the segment points is not found in the steps S105 and S106, it proceeds to a step S110 and the frames are manually allocated. This process is the same as the one described in the first embodiment. To be more specific, the video frames are reproduced to specify a starting frame and an ending frame corresponding to both ends of the route. And in a step S111, grouped frames between the specified starting frame and ending frame are allocated to the route as explained in FIG. 11. Also, in the case where faulty GPS data exists in the grouped frames sandwiched by the starting frame and the ending frame, it proceeds from the step S108 to the step S111 to allocate the grouped frames sandwiched by the starting frame and the ending frame determined in the step S107 to the route as explained in FIG. 11.

Thereafter, in a step S112, it is determined whether an instruction to terminate was given or not, and if not, the process is returned to the steps S104 and the above process is repeated. On the other hand, if the instruction to terminate was given, it terminates this process.

Moreover, the positions (x, y) on the map can be acquired by a function f ($\theta$, $\phi$) (the function f differs depending on a method of projecting when creating a map). To be more specific, the GPS data is converted as follows to position coordinates on the map and plotted on the displayed map.

Position (x, y)=f($\theta$, $\phi$)

It is possible to display it by connecting the plotted points by a line. FIG. 15 shows an example of displaying the plot by connecting it by a dotted line.

The user can recognize any portion with a significant error in measurement by GPS or missing the GPS data from display contents of the map data display division 301. In the example of FIG. 15, a GPS error is significant at the point of 1501, and the GPS data is missing at the point of 1502.

In FIG. 15, if a route 1513 having segment points 1511 and 1512 at both ends is selected and both segment points are associated with the video frame as mentioned above, then the video frame can be associated with the position data more correctly as to the 1501 portion having a significant error in measurement. Also, if a route 1523 having segment points 1521 and 1522 at both ends is selected and both segment points are associated with the video frame as mentioned above, then the video frame group including the point 1502 that was incapable of measurement by GPS can be correctly associated with the position data.

Moreover, in the above embodiment, while the GPS data is used as-is with the position data to register in the frame position information 917 in the case where the GPS data error is in an allowable range to the route, it is not limited thereto. For instance, it is also possible, if the starting frame and the ending frame are determined based on the GPS data, to associate them with the segment points and also to associate the grouped frames sandwiched by these frames with the route by applying the technique explained in FIG. 11 instead of using the GPS data.

As described above, according to the second embodiment, it is possible, even in the case where the position data cannot be acquired by GPS or an error included in the position data is too significant to be ignored, to acquire the position data in a simple manner and associate the image data with the position data. In addition, as it allows the video frames collected by the image data collection system to be associated with the positions on the map just by supplementing an imperfect portion by GPS, associating the video frames with the positions becomes easier.

Moreover, as for the instances of missing the GPS data, there are cases where the GPS data cannot be recorded at a rate of image sequence (30 frames/sec) in addition to the cases of the above error in measurement. To be more specific, there is no problem in the case where GPS measurement result data can be acquired for each individual frame as shown in FIG. 14, and if otherwise, frame position information between the frames where GPS is recorded can be acquired by interpolation.

In this case, for instance, in the case where the GPS data is recorded as to frame i (position ($u_i$, $v_i$)) and frame i+n (position ($u_{i+n}$, $v_{i+n}$)), the position ($u_x$, $v_x$)) of each of these frames x (x=i+1, ..., i+n−1) between frame i and frame i+n can be acquired as follows for instance.

$$u_x = u_i + (x-i)(u_{i+n} - u_i)/n$$

$$v_x = v_i + (x-i)(v_{i+n} - v_i)/n$$

Moreover, while a position of each frame x is acquired by linear interpolation in the above case, it is not limited thereto.

As above, in the case where the GPS data is sparsely sampled from the image frames, it is also possible to acquire the position information by interpolation as to the image frames of which position information has nor been acquired.

Third Embodiment

Next, an image reproduction system using a database linking the map and the images as mentioned above will be described.

Figure 17:
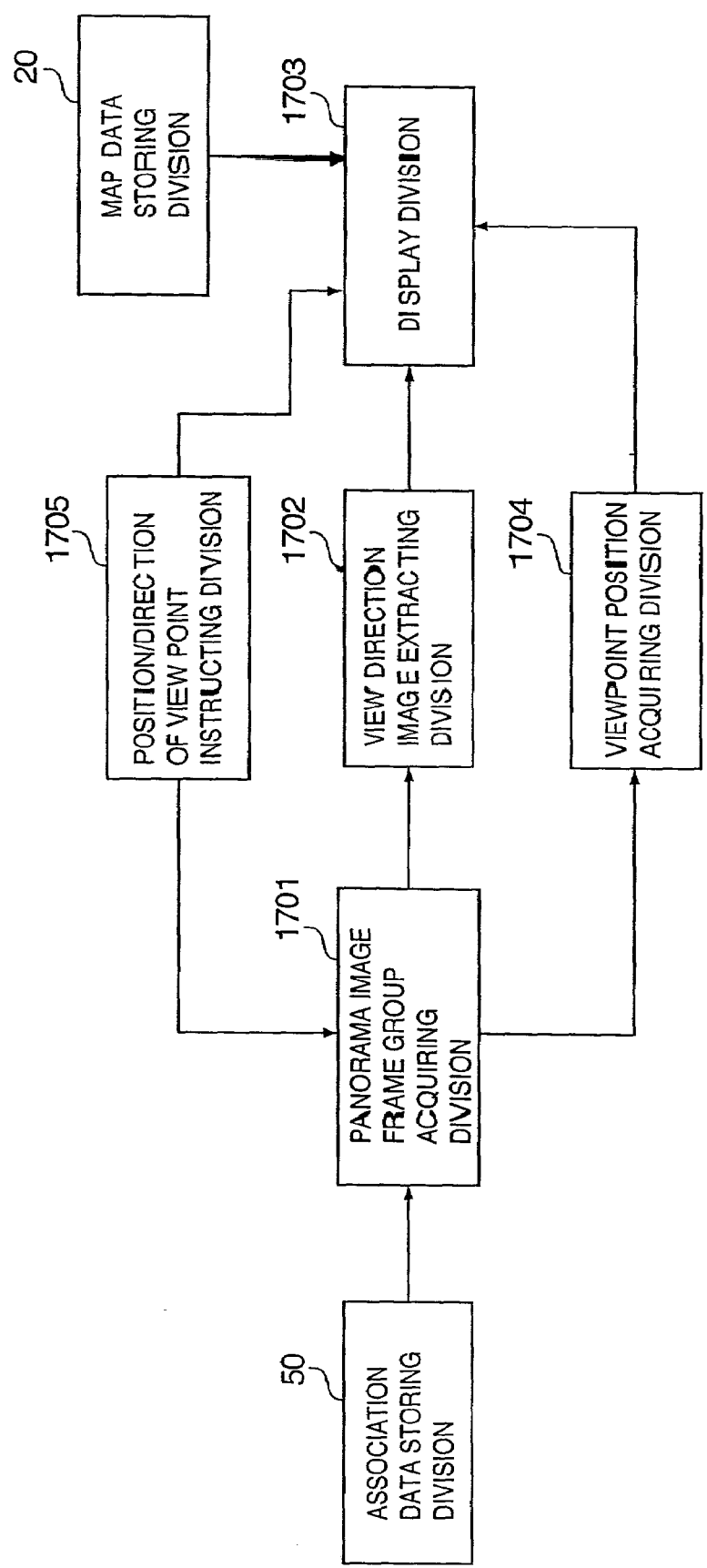
FIG. 17 is a block diagram showing configuration of functions of an image data reproduction system according to a third embodiment.

FIG. 17 is a block diagram explaining configuration of functions of the image reproduction system. Moreover, configuration of apparatuses of the reproduction system is the same as that in the above-mentioned first embodiment (FIG. 6), and the CPU 101 executes the control program stored in the ROM 106 or loaded in RAM 107 to implement the functions shown in FIG. 17.

In FIG. 17, association data including the above-mentioned route list 910 (FIG. 9B) is held in the association data storing division 50. Moreover, in this embodiment, the frames stored in the association data storing division 50 are panorama images acquired by merging a plurality of images of the same frame number obtained from a plurality of cameras. In addition, the association data has the starting and ending frames of the routes registered, and the frame position information 917 has a default form.

1701 is a panorama image frame group acquiring division, and acquires grouped frames corresponding to the "route" to be reproduced from the association data storing division 50 and outputs them for display processing in order according to a reproducing direction. Moreover, it posts a viewpoint position acquiring division 1704 on what ordinal numbers of the "route" the outputted frames have. 1702 is a line of view direction image extracting division, and extracts a partial image corresponding to a specified line of view direction from the panorama image acquired from the panorama image frame group acquiring division 1701. 1703 is a display division, and displays on the CRT 104 the partial image extracted by the line of view direction image extracting division 1702, and also displays a map based on the map data held by the map data storing division 20.

1704 is a viewpoint position acquiring division, and identifies the current position on the "route" based on what ordinal number of the frame group acquired by the panorama image frame group acquiring division 1701 the frame to be extracted by the line of view direction image extracting division 1702 has (posted by the panorama image frame group acquiring division 1701). This current position information is sent to the display division 1703, and is used to display the current position on the map. 1705 is a position/direction of viewpoint instructing division, and gives instructions for the current position and the view direction of the user.

Figure 18:
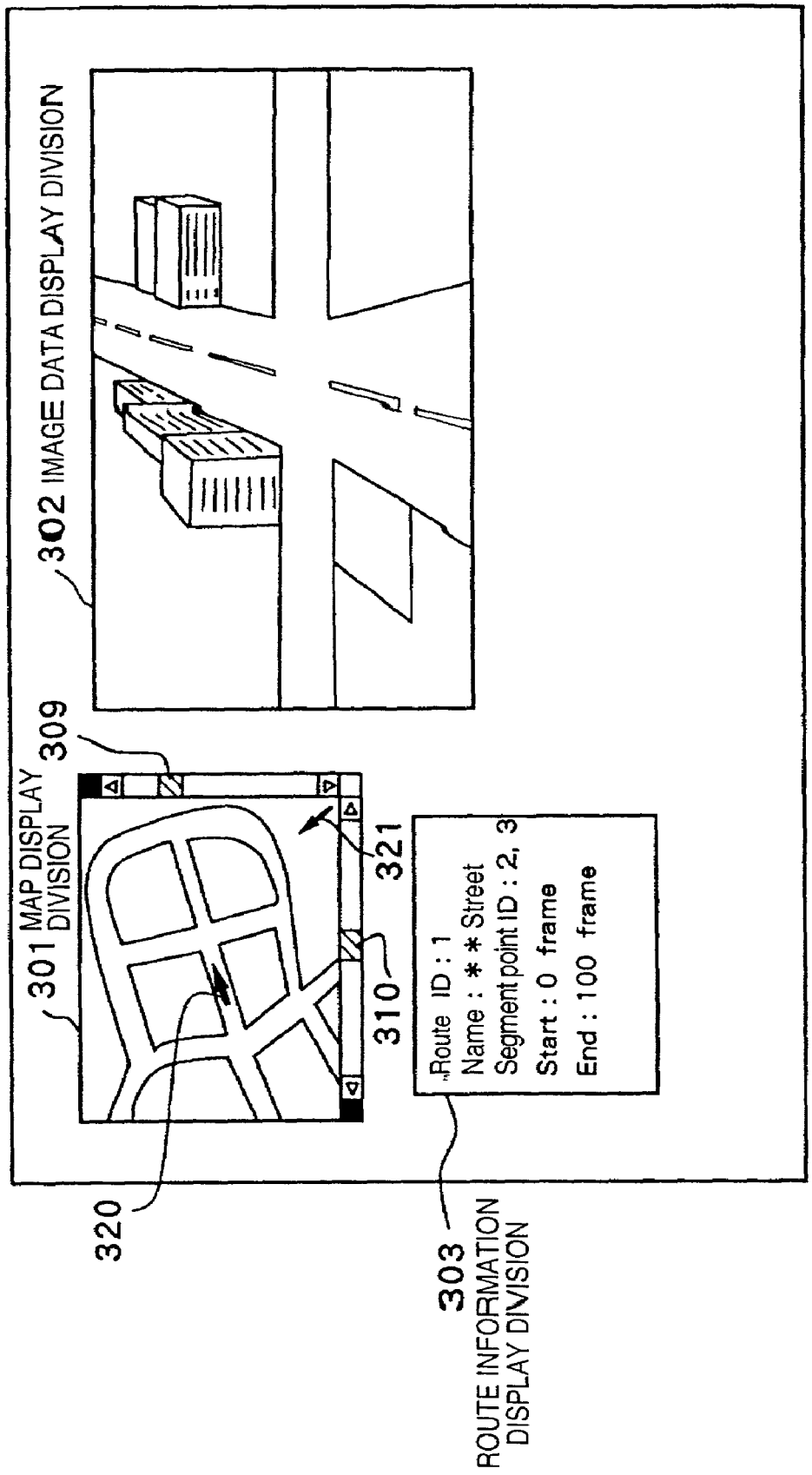
FIG. 18 is a diagram showing an example of display according to the third embodiment.

FIG. 18 is a diagram showing an example of display according to the third embodiment. As shown in FIG. 18, the map data display division 301 that is a window of the map and the image data display division 302 that is a window for displaying a photographed image are displayed in the screen, where reproducing operation is performed with a joystick and mouse (not shown). The image data display division 302 displays the image acquired by the panorama image frame group acquiring division 1701 and extracted by the view direction image extracting division 1702. Moreover, the view direction is detected based on inclination of the joystick by the position/direction of viewpoint instructing division 1705 and is posted to the view direction image extracting division 1702.

In addition, the window 301 of the map displays the map information acquired from the map data storing division. The map data display division 301 displays a position mark 320 indicating the position and its view direction displayed in the image data display division 302. It is also possible to modify the displayed map to be in the most suitable position by manipulating scroll bars 309, 310 provided on the right of and below the map data display division 301.

In the above configuration, the data shown in FIG. 12 is read and the grouped frames on the route where the viewpoint position exists are reproduced in order. For instance, if the current viewpoint position corresponds to a j-th position on a route i, the j-th frame on the route i will be displayed in the image data display division 302. Along with it, it acquires by interpolation the position of the j-th frame on the map from the coordinates on the map of both segment points sandwiching the route i, and displays the position mark 320 (moreover, in the case where there is the frame position information 917 shown in FIG. 9B, the position of the j-th frame on the map can be acquired from that information). To be more specific, the reproduction system displays the images based on the frames held by the association data storing division 50, and also simultaneously displays the map data on the screen to indicate the current position (the position of the j-th frame) on the map with the position mark 320 such as an arrow.

In the case of advancing the route i, a reproduced image is displayed by using the grouped frames corresponding to the route i, and the position of each individual frame is acquired and displayed on the map. Traveling on the route i for a while leads to the frame corresponding to the segment point. If the segment point is reached, a route to advance next is determined based on the view direction then and the direction of the route connected to the segment point.

Figure 19:
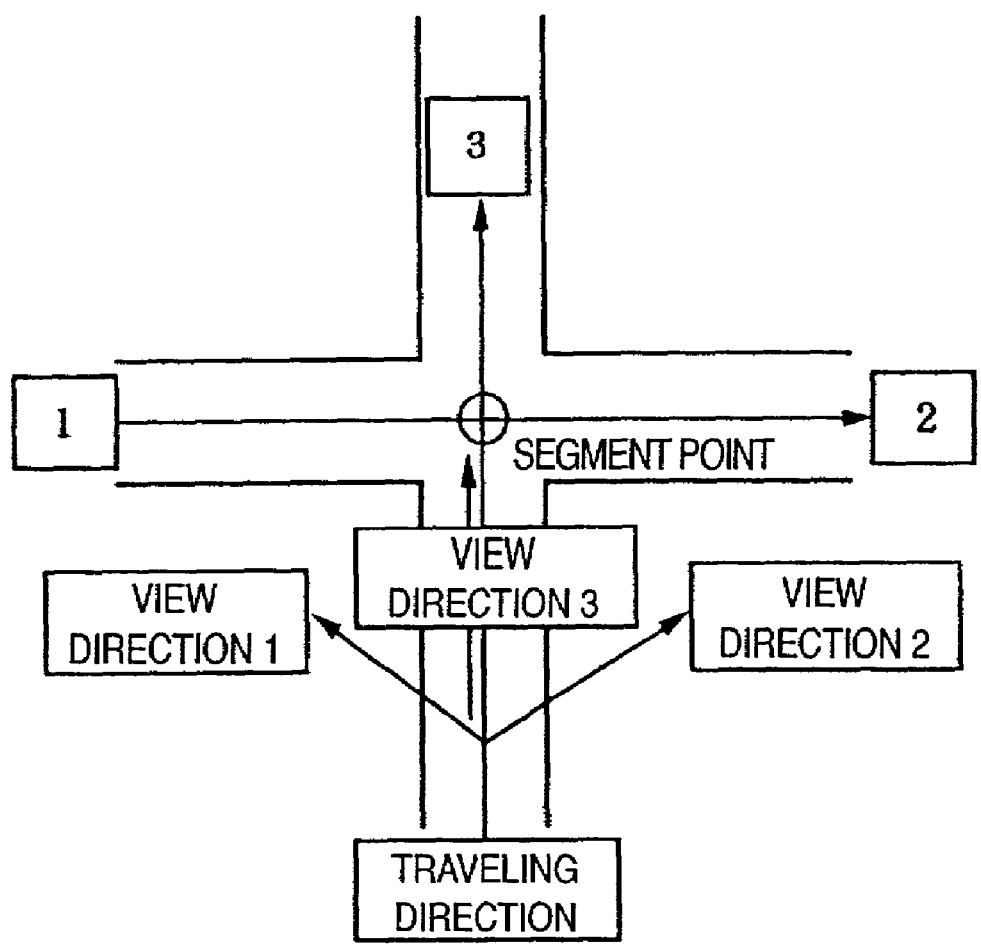
FIG. 19 is a diagram explaining change of a traveling direction during image reproduction.

FIG. 19 is a diagram explaining determination of a traveling direction. For instance, if the segment point is reached in a state of facing the view direction 1, the route in the direction of [1] is selected. Consequently, the frame group corresponding to the route of [1] is selected by the panorama image frame group acquiring division 1701 so that the image is reproduced and the position is displayed on the map.

Now, in the case of moving in a virtual urban space by a sequence of photographed images as above, image reproduction is started from a predetermined initial position so that it is required, when moving to a desired position, to travel along the route on the map where the grouped frames exist, taking wasteful time and effort. Therefore, in this embodiment, in the case where the user specifies a desired position on the map, it allows reproduction to be started from the image in the closest position to the specified position so as to improve its operability.

For instance, if the user moves a cursor 321 with the mouse and so on in the map data display division 301, and gives an instruction for the desired position, a click position on the map is calculated, the closest route to the click position is detected, and reproduction is started from the frame in the closest position to the click position on the route.

Figure 20:
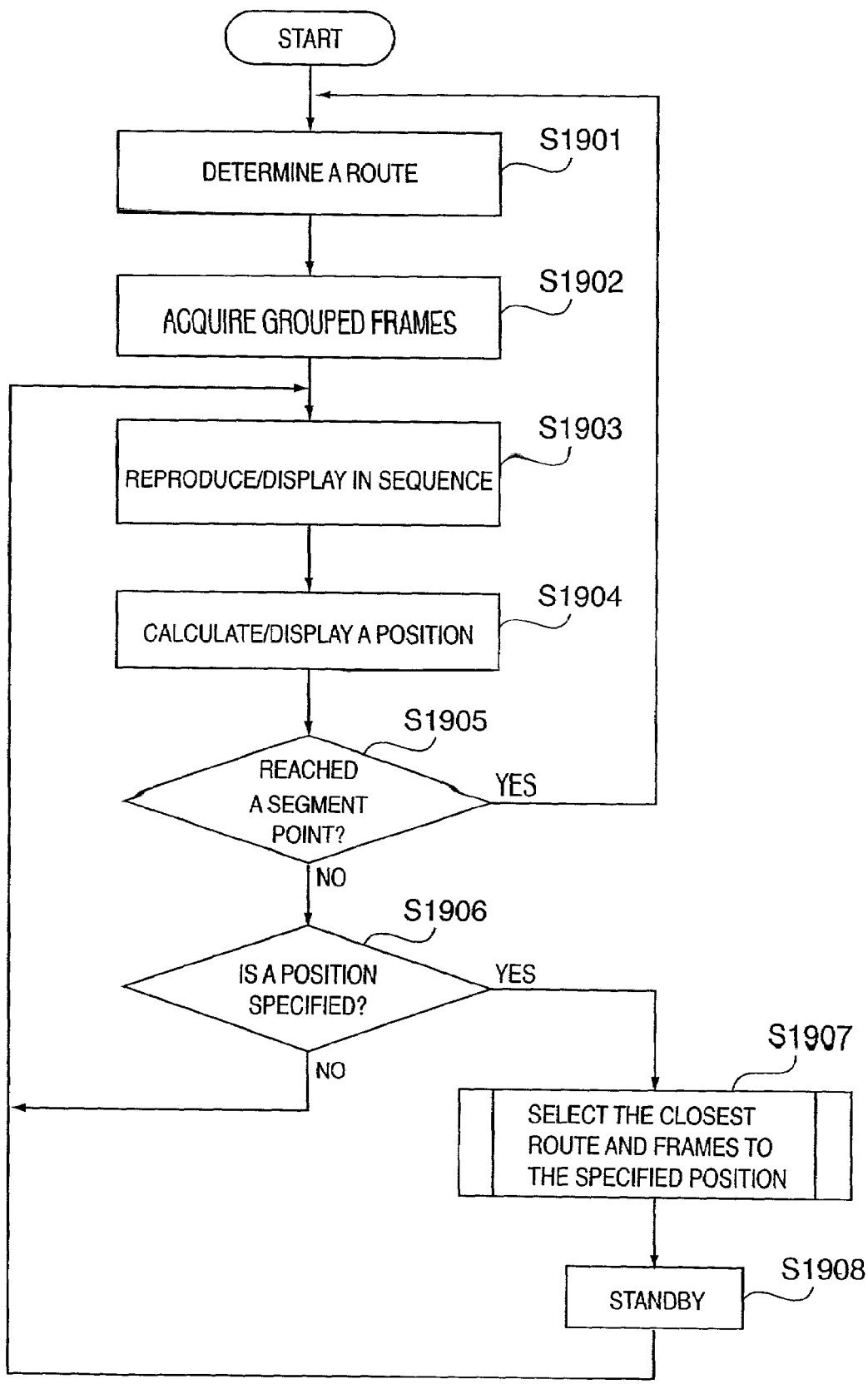
FIG. 20 is a flowchart explaining an image reproduction process according to the third embodiment.

FIG. 20 is a flowchart explaining a control procedure for implementing the above user interface. In FIG. 20, if a route to be displayed is determined in a step S1901, grouped frames corresponding to the determined route are acquired in a step S1902. And in a step S1903, the acquired images are sequentially displayed on the image data display division 302. Moreover, a view direction is provided by a direction of the joystick lever. Also, at that time, the position of the frame being displayed is calculated, and an arrow indicating the current reproduction position is displayed based on this calculation result on the map data display division 301 in a step S1904.

And if the reproduced images reach the frame of the segment point (namely, the starting frame or ending frame of the "road"), a route to advance next is determined by the method mentioned above in FIG. 19 (step S1901), and the images are reproduced by the process from the above step S1902 onward.

Moreover, if the desired position in the map data display division 301 is clicked on with the mouse during the above image reproduction, the process proceeds from a step S1906 to a step S1907. In the step S1907, the closest route to the clicked-on position on the map is searched for, and the closest frame to the click position on the route is further selected. In a step S1908 thereafter, the reproduction start frame determined in the step S1907 is displayed in a static manner and it enters a standby state. If an instruction for a start of advancing is given by the joystick, it returns to the step S1903, and starts image reproduction to the image data display division 302 by using the grouped frames acquired in the step S1907.

Next, the process of selecting a route and a frame close to the click position in the step S1907 will be described by referring to the flowchart of FIG. 21.

If an event of clicking on the map occurs in a step S2001, it proceeds to a step S2002, and acquires a clicked-on coordinate position of the map (x, y). And it proceeds to a step S2003, selects "routes" in order from the route list stored in the association data storing division, and then calculates the distance between the selected "route" and the clicked-on position in a step S2004. The above process of the step S2003 and the step S2004 is executed to all the routes registered on the route list (step S2005).

If the distance from the clicked-on position is calculated for all the routes, it proceeds to a step S2006 and selects a route of the shortest distance as "the closest route to the clicked-on position on the map."

Furthermore, in the step S2007, it draws a perpendicular from the clicked-on point to the "route" selected in the step S2006 to acquire an intersection of the "route" and the perpendicular so as to acquire an image frame corresponding to this intersection. For instance, grouped frames associated with the selected "route" are acquired and this "route" is equally divided by the number of frames of the frame group. And then, the closest divided position to the above intersection is determined to acquire a corresponding frame.

In a step S2008, the ID of the "route" and the image frame number acquired as above are returned.

Moreover, while the above embodiment shows a case where a desired position is specified during image reproduction, it is also possible to allow the initial position of image reproduction to be set as desired on the map data display division 301.

In addition, in the third embodiment, while the closest route is selected by calculating the distance from the click position, it is also possible to create and hold a table (information associating click positions on the map with routes for unique determination) of associations of click positions and routes in advance. The process in the step S1907 in this case will be described by referring to the flowchart of FIG. 22.

Figure 22:
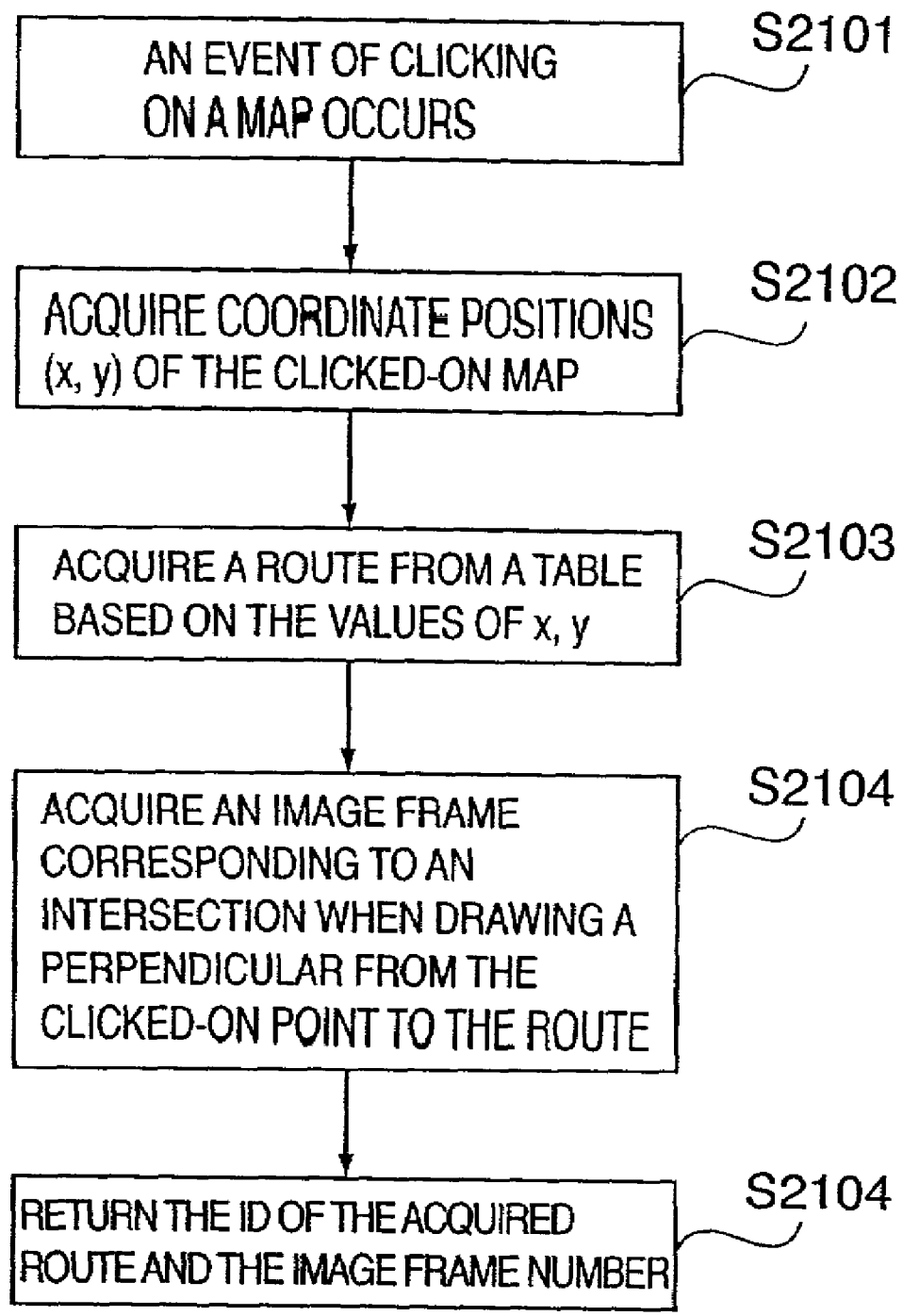
FIG. 22 is a flowchart showing another procedure for acquiring a frame to be reproduced from a specified position.

In FIG. 22, if an event of clicking on the map occurs in a step S2101, it proceeds to a step S2102, and acquires a clicked-on coordinate position of the map (x, y). And it proceeds to a step S2103 next, and acquires a route associated with (x, y) from the above table. Thereafter, it proceeds to a step S2104, and it draws a perpendicular from the clicked-on point to the "route" selected in the step S2103 to acquire an intersection of the "route" and the perpendicular so as to acquire an image frame corresponding to this intersection. For instance, grouped frames associated with the selected "route" are acquired and this "route" is equally divided by the number of frames of the frame group. And then, the closest divided position to the above intersection is determined to acquire a corresponding frame. In a step S2105, an ID of the route and the image frame number acquired as above are returned as a consequence.

Figure 21:
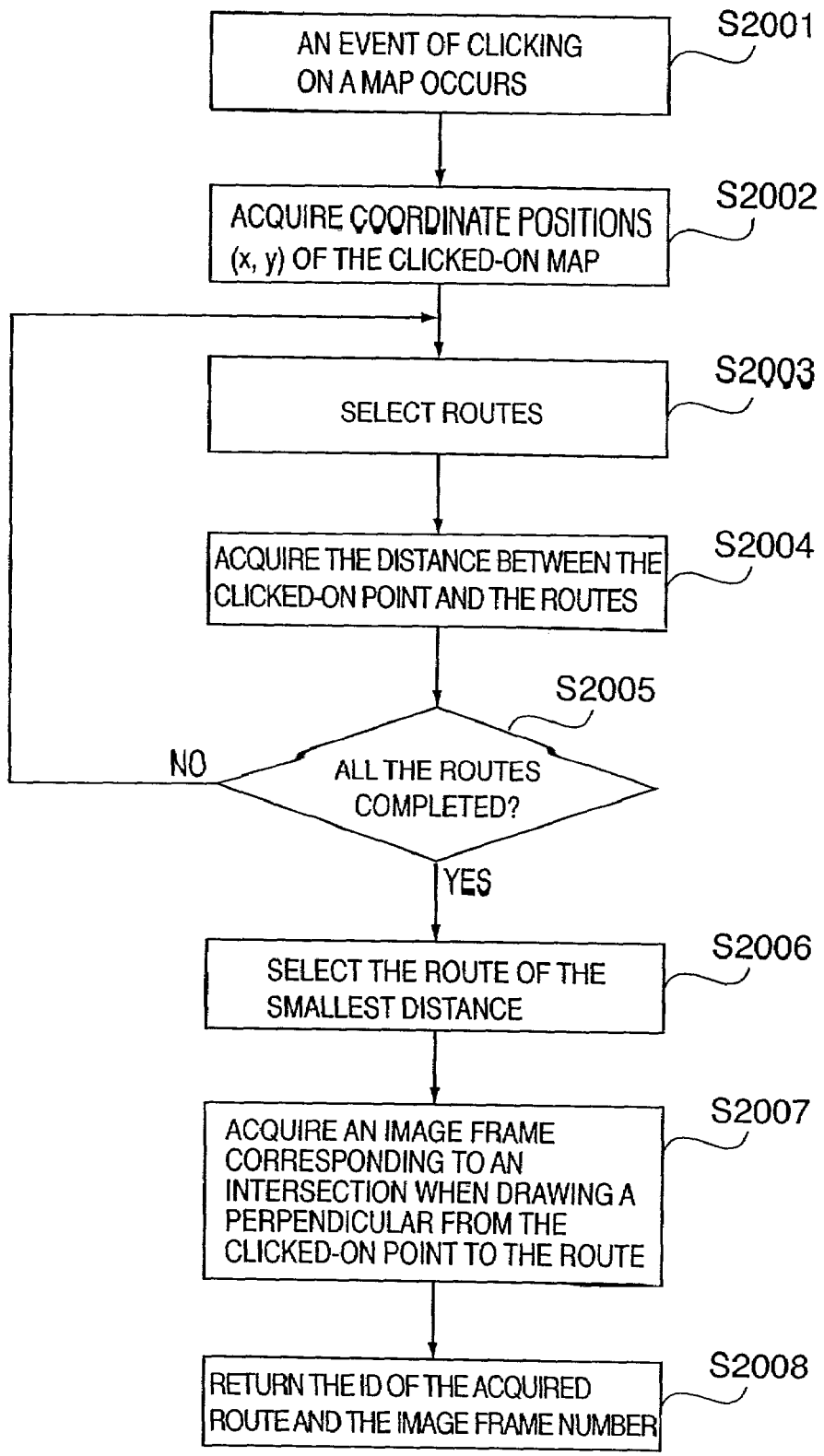
FIG. 21 is a flowchart showing a procedure for acquiring a frame to be reproduced from a specified position.

As above, according to the process shown in the flowcharts of FIGS. 21 and 22, it is no longer necessary to have position information on each individual frame and so management is easier, since a route close to a click position is selected and then a frame is identified. In addition, in the case of the process in FIG. 21, it is no longer necessary, as a distance from the "route" is calculated, to calculate a distance for each individual frame and so the amount of calculation can be reduced. Moreover, according to the process in FIG. 22, high-speed process becomes possible since distance calculation is no longer necessary.

Furthermore, in the case where a plurality of frame sequences corresponding to a plurality of districts are included, it is also possible to display a wide-area map including such a plurality of districts and make selectable the frame sequence of the closest district to the click position on the wide-area map. In this case, a map of a district corresponding to the selected frame sequence is displayed first and then the frame corresponding to the click position is specified by the above-mentioned procedure. Moreover, it is also possible, in the case where the extent of the wide-area map is so wide that a plurality of districts become candidates for the click position, to configure it so that it displays a wide-area map including such candidate districts (representing an extent narrower than the previous wide-area map) so as to narrow it down.

Fourth Embodiment

In the fourth embodiment, a function which, by specifying an arbitrary position on the map, displays an image corresponding to the position and also, by specifying a plurality of segment points on the map, reproduces a plurality of images corresponding to paths formed among them as moving images or by frame advance. Thus, a scenic image in any position on the map can be reproduced. In addition, an image (an image of each individual camera) in a different direction in the same position can be reproduced. Moreover, a frame corresponding to an arbitrary position specified on the map is identified as above.

Figure 23:
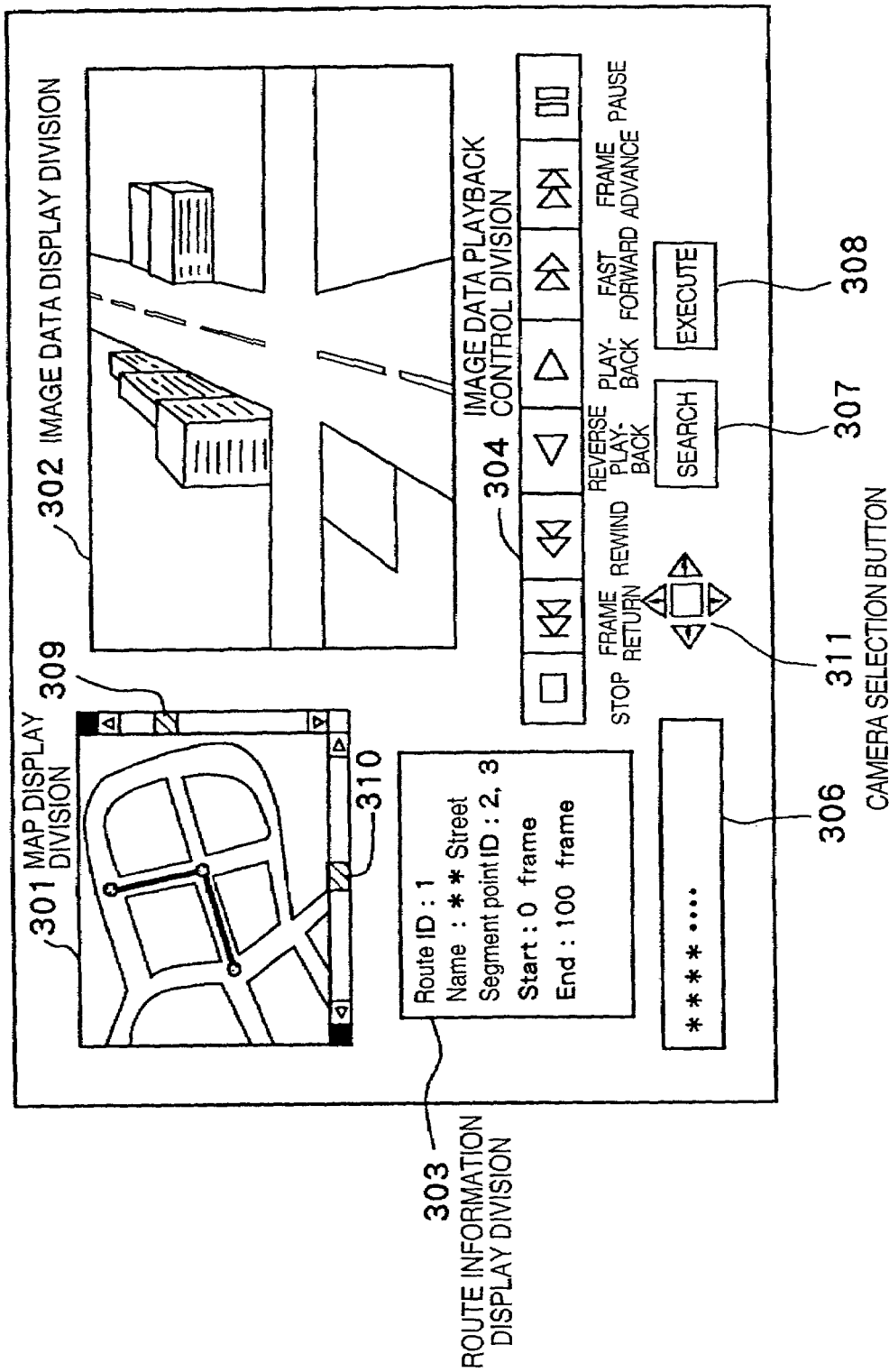
FIG. 23 is a drawing showing an example of display according to the fourth embodiment.

FIG. 23 shows a user interface for implementing this function. While it has a part basically similar to the user interface in FIG. 10, it can be switched and used as appropriate according to a function to be performed.

The window 301 of the map and the image data display division 302 displayed in the screen are formed, and are operated with the operation button of the image data reproduction control division 304.

First, clicking on a search button 307 with the mouse or the like displays a place name entry space 306 to enter an arbitrary place name. Then, clicking on an execution button 308 displays a map of a district corresponding to the place name entered in the map data display division 301. At this time, any static image can be displayed as an initial image in the image data display division. In this case, the displayed image may be an image corresponding to or the closest to the entered district. It is also possible to modify the displayed map to be in the most suitable position by manipulating scroll bars 309, 310 provided on the right of and below the map data display division 301.

Next, clicking on an arbitrary position with the mouse or the like on the displayed map displays the segment point in the specified position. It is displayed as a circle in this drawing.

Specifying this segment point and then clicking on a playback button of the reproduction control division 304 displays an image linked to that segment point in the image data display division.

In addition, if a plurality of segment points are specified in advance, the paths among the segment points are displayed (thick lines in the drawing), and clicking on them with the mouse or the like for selection (a path selected then is displayed in a different manner such as change of color) and clicking on the reproduction button can successively reproduce in order and as moving images a plurality of images linked on the path. Moreover, the direction of moving image reproduction can be selected with a forward playback button and a reverse playback button.

In addition, it is possible, by using a frame advance button and a frame reverse button, to reproduce images on the selected path while checking them by frame advance. Moreover, it is possible during reproduction to temporarily stop the reproduction operation with a pause button.

Furthermore, as the reproduced images to be displayed exist corresponding to the plurality of cameras respectively, the direction of the cameras, that is, the reproduced images in the respective locations can be selected by manipulating a direction selection button 311. In addition, at the time of reproduction, the segment points may be set not only at branch points but also at any point on the paths.

It is possible, by the above system, to display a map of an arbitrary district and check a landscape in an arbitrary position on the map. This system is capable of various applications, that is, not only for simulation of change of the landscape according to the map and traveled paths but also as a function, of a car navigation system and so on, of allowing the landscape, marks and so on of an advancing route to be known beforehand.

As described above, the present invention allows the photographed image data to be associated with the position in a real space by simple operation.

Also, in the case of associating the photographed image data with the position in the real space by using GPS, the present invention allows association by simple operation as to a portion that could not be properly associated.

Moreover, according to the present invention, as the segment points already set are associated with the frame data and positions of the grouped frames between the segment points are acquired by interpolation, it becomes possible to associate the photographed image data with the position in the real space more easily and with less data.

Furthermore, the present invention allows the position to start reproduction of the photographed image to be specified on the map.

Also, it is needless to say that the objects of the present invention are also attained by supplying a storage medium having recorded a program code of the software for implementing the functions of the aforementioned embodiments to a system or an apparatus and having a computer (or a CPU and an MPU) thereof read and execute the program code stored in the storage medium.

In this case, the program code read from the storage medium itself implements the functions of the aforementioned embodiments, and the storage medium storing the program code constitutes the present invention.

As a storage medium for storing the program code, for instance, a floppy disk, a hard disk, an optical disk, a magneto-optical disk, a CD-ROM, CD-R, a magnetic tape, a nonvolatile memory card, a ROM and so on can be used.

Moreover, it is needless to say that it includes the case where, as the computer executes the program code it has read, the functions of the aforementioned embodiments are implemented, and besides, an OS (operating system) and so on in operation on the computer perform a part or all of the actual processing based on instructions of the program code, which processing implements the functions of the aforementioned embodiments.

Furthermore, it is needless to say that it includes the case where, after the program code read from the storage medium is written to a memory provided to a feature expansion board inserted into the computer or a feature expansion unit connected to the computer, the CPU and so on placed on the feature expansion board or the feature expansion unit perform a part or all of the actual processing based on the instructions of the program code, which processing implements the functions of the aforementioned embodiments.

As many apparently widely different embodiments of the present invention can be made without departing from the spirit and scope thereof, it is to be understood that the invention is not limited to the specific embodiments thereof except as defined in the claims.

What is claimed is:

1. An image recording apparatus for constructing a virtual space capable of walkthrough using photographed image data, said apparatus comprising:
   a map information storing unit adapted to store map data;
   an image data storing unit adapted to store image data photographed by using a plurality of photographing apparatuses and to store position measurement by GPS to the respective frames of the image data;

an association data storing unit adapted to store association data, the association data associating a frame stored in said image data storing unit with a segment point set on a map represented by the map data, and associating frames that are between two frames respectively associated with two segment points with a section defined by the two segment points;

a map display unit adapted to display a map image based on said map data and display the position measurement; and a generating unit adapted to generate the association data, wherein said generating unit includes:

a setting unit adapted to set the segment points by specifying desired positions on said displayed map image;

a first associating unit adapted to automatically associate a frame stored in said image data storing unit with the segment point set by said setting unit based on the position measurement;

a second associating unit adapted to associate a frame stored in said image data storing unit with the segment point based on a manual instruction; and a section associating unit adapted to associate frames, which are between two frames respectively associated with two segment points by said first or said second associating unit, with a section defined by the two segment points.

2. The apparatus according to claim 1, wherein said section associating unit divides said section by a number of grouped frames and allocates the frames to the respective divided positions.

3. An image recording method for constructing a virtual space capable of walkthrough using photographed image data, the method comprising:

a map information storing step of storing map data;

an image data storing step of storing image data photographed by using a plurality of photographing apparatuses and storing position measurement by GPS to the respective frames of the image data;

an association data storing step adapted to store association data, the association data associating a frame stored in said image data storing step with a segment point set on a map represented by the map data, and associating frames that are between two frames respectively associated with two segment points with a section defined by the two segment points;

a map display step of controlling to display a map image based on said map data and display the position measurement; and a generating step adapted to generate the association data; wherein said generating step includes:

a first associating step adapted to automatically associate a frame stored in said image data storing step with a segment point set by a setting unit based on the position measurement;

a second associating step adapted to associate a frame stored in said image data storing step with a segment point based on a manual instruction; and a section associating step adapted to associate frames, which are between two frames respectively associated with two segment points by said first or said second associating steps, with a section defined by the two segment points.

4. An image processing apparatus for constructing a virtual space capable of walkthrough using photographed image data, said apparatus comprising:

a photographed image storing unit adapted to store photographed images obtained by using a plurality of photographing apparatuses that are configured for obtaining a panoramic image;

a map data storing unit adapted to store map data; and an image-map association unit adapted to associate the photographed images with the map data based on a user's instruction, wherein said image-map association unit includes an operation display which has;

a map data display adapted to display the map data;

an image display adapted to display the photographed images of a plurality of frames obtained by each of the photographing apparatuses, in synchronization, and playback control means adapted to control playing back the photographed images on said image display based on frame number according to a user's operation.

5. The apparatus according to claim 4, wherein the number of images displayed in synchronization by the image display can be designated by a user.

6. The apparatus according to claim 4, wherein the photographed images of the plurality of frames are a plurality of successive photographed images.

7. An image processing method for constructing a virtual space capable of walkthrough using photographed image data, said method comprising:

a providing step of providing an operation display which includes (i) a map display displaying map data obtained from a map data storage unit storing map data, (ii) an image display displaying photographed images obtained from a photograph image storage unit storing images photographed by a plurality of photographing apparatuses that are configured for obtaining a panoramic image, the photographed images being a plurality of frames obtained by each of the photography apparatuses, in synchronization, and playback control means adapted to control playing back the photographed images on the image display based on a frame number according to a user's operation; and an image-map association step of associating the map data and the photographed images based on a user's instruction made through the operation display.

8. A computer readable medium storing a control program for making a computer perform an image recording method for constructing a virtual space capable of walkthrough using photographed image data, the method comprising:

a map information storing step of storing map data;

an image data storing step of storing image data photographed by using a plurality of photographing apparatuses and storing position measurement by GPS to the respective frames of the image data;

an association data storing step adapted to store association data, the association data associating a frame stored in said image data storing step with a segment point set on a map represented by the map data, and associating frames that are between two frames respectively associated with two segment points with a section defined by the two segment points;

a map display step of controlling to display a map image based on said map data and display the position measurement; and a generating step adapted to generate the association data; wherein said generating unit includes:

a first associating step adapted to automatically associate a frame stored in said image data storing step with a segment point set by a setting unit based on the position measurement;

a second associating step adapted to associate a frame stored in said image data storing step with a segment point based on a manual instruction; and a section associating step adapted to associate frames, which are between two frames respectively associated with two segment points by said first or said second associating steps, with a section defined by the two segment points.

9. A computer readable medium storing a control program for making a computer perform an image processing method for constructing a virtual space capable of walkthrough using photographed image data, the method comprising:

a providing step of providing an operation display which includes (i) a map display displaying map data obtained from a map data storage unit storing map data, (ii) an image display displaying photographed images obtained from a photograph image storage unit storing images photographed by a plurality of photographing apparatuses that are configured for obtaining a panoramic image, the photographed images being a plurality of frames obtained by each of the photography apparatuses, in synchronization, and playback control means adapted to control playing back the photographed images on the image display based on a frame number according to a user's operation; and an image-map association step of associating the map data and the photographed images based on a user's instruction made through the operation display.

* * * * *

UNITED STATES PATENT AND TRADEMARK OFFICE
CERTIFICATE OF CORRECTION

PATENT NO. : 7,110,592 B2
APPLICATION NO. : 09/799518
DATED : September 19, 2006
INVENTOR(S) : Daisuke Kotake et al.

Page 1 of 1

It is certified that error appears in the above-identified patent and that said Letters Patent is hereby corrected as shown below:

ON THE TITLE PAGE, AT ITEM (56) RC:
Foreign Patent Documents, "JP 2000235576" should read --JP 2000-235576--;
"JP 2001-5994 * 1/2001" should be DELETED.

COLUMN 2:
Lines 51, 52, 56, 58, 67, "above described" should read --above-described--.
Line 65, "above" should read --above- --.

COLUMN 3:
Lines 3, 4, 5, 7, 8, 18, 19, 24, 26, 28, 33, 34, 36, "above described" should read --above-described--.

COLUMN 6:
Line 38, "an" should read --a--.

COLUMN 13:
Line 27, "nor" should read --not--.

Signed and Sealed this

Fifth Day of June, 2007

JON W. DUDAS
*Director of the United States Patent and Trademark Office*